United States Patent
Hayashi et al.

(10) Patent No.: US 7,451,747 B2
(45) Date of Patent: Nov. 18, 2008

(54) HEATING SYSTEM FOR LIQUEFIED GAS FUEL SUPPLY APPARATUS AND FUEL SUPPLY APPARTUS FOR LIQUEFIED GAS ENGINE

(75) Inventors: Kenji Hayashi, Aichi (JP); Takao Komoda, Aichi (JP); Masanori Torii, Aichi (JP); Toshinari Saiki, Aichi (JP); Masayuki Kosaka, Aichi (JP); Toshimitsu Taguchi, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 376 days.

(21) Appl. No.: 11/154,735

(22) Filed: Jun. 17, 2005

(65) Prior Publication Data

US 2006/0027216 A1  Feb. 9, 2006

(30) Foreign Application Priority Data

Jun. 17, 2004 (JP) ............................. 2004-179994
Jul. 13, 2004 (JP) ............................. 2004-206247

(51) Int. Cl.
*F01P 3/12* (2006.01)
*F02M 21/06* (2006.01)

(52) U.S. Cl. ..................................................... 123/557

(58) Field of Classification Search .......... 123/543–557
See application file for complete search history.

(56) References Cited

U.S. PATENT DOCUMENTS 4,170,200 A * 10/1979 Takeuchi et al. ................ 123/3
4,359,996 A * 11/1982 Kirkland, Jr. ................ 123/557
4,811,720 A    3/1989 Katumata et al.

FOREIGN PATENT DOCUMENTS

JP          358051262 A  *  3/1983 ................. 123/547
JP          A-04-034449      2/1992

* cited by examiner

*Primary Examiner*—Marguerite McMahon
(74) *Attorney, Agent, or Firm*—Oliff & Berridge, PLC

(57) ABSTRACT

A heating system for liquefied gas fuel supply apparatus is applied to a liquefied gas fuel supply apparatus that causes a vaporizer to vaporize liquefied gas fuel and supplies the vaporized fuel to an internal combustion engine, the heating system including a circulation circuit and a heat insulating container. The circulation circuit circulates a heating medium between the vaporizer and an inside of the internal combustion engine. And, the heat insulating container stores the heating medium. In this case, the heat insulating container is disposed in the circulation circuit.

6 Claims, 13 Drawing Sheets

HEATING SYSTEM FOR LIQUEFIED GAS FUEL SUPPLY APPARATUS AND FUEL SUPPLY APPARTUS FOR LIQUEFIED GAS ENGINE

BACKGROUND OF THE INVENTION

1. Field of the Invention

The present invention relates to a heating system for liquefied gas fuel supply apparatus, which includes a vaporizer that vaporizes liquefied gas fuel and a circulation circuit that circulates heating medium between the vaporizer and an internal combustion engine.

2. Description of the Related Art

As is well known, an internal combustion engine of a vehicle, etc., which uses liquefied gas fuel such as liquefied petroleum gas (LPG) or compressed natural gas (CNG), is configured such that fuel stored under high pressure is vaporized by a vaporizer for combustion. The vaporizer is cooled by the latent heat of vaporization of fuel, but when the vaporizer is excessively cooled, fuel is insufficiently vaporized, which adversely affects fuel injection control, etc.

JP Hei.4-034449 U discloses a system that heats a vaporizer so as to prevent such excessive cooling. The heating system of JP Hei.4-034449 U is configured such that cooling water is circulated in the vaporizer and the vaporizer is heated by the heat of cooling water heated inside an engine.

SUMMARY OF THE INVENTION

However, in such a heating system, since cooling water is not sufficiently heated during the cold start of the internal combustion engine, the vaporizer cannot be sufficiently heated, so that it is difficult to secure low-temperature startability.

For that matter, as seen in U.S. Pat. No. 4,811,720, if the vaporizer is configured to be heated using an electric heater such as a PTC heater, it is possible to heat the vaporizer even during cold start. However, to sufficiently heat the vaporizer, the capacity of the heater has to be increased, and there arises a problem that power consumption increases.

The invention has been made in view of the above circumstances. The invention provides a heating system for a liquefied gas fuel supply apparatus, which can effectively heats a vaporizer.

According to one embodiment of the invention, a heating system for a liquefied gas fuel supply apparatus, includes a circulation circuit and a heat insulating container. The liquefied gas fuel supply apparatus vaporizes liquefied gas fuel by a vaporizer to supply the vaporized gas fuel to an internal-combustion engine. The circulation circuit circulates heating medium between the vaporizer and an inside of the internal-combustion engine. The heat insulating container stores the heating medium, the heat insulating container disposed in the circulation circuit.

In the aforesaid configuration, when the heating medium is circulated between the vaporizer and the inside of the engine, the heat of the heating medium heated by the heat of the internal combustion engine is conducted to the vaporizer, so that the vaporizer can be efficiently heated using the heat of the internal combustion engine. Besides, the heated heating medium is stored in the heat insulating container and thermally insulated even during engine stop. This thermally insulated heating medium is supplied to the vaporizer, thereby making it possible to heat the vaporizer even during engine cold start. Accordingly, the vaporizer can be efficiently heated even during engine cold start.

According to one embodiment of the invention, the heating system may include a shutoff valve that shuts off circulating of the heating medium to the vaporizer.

In the aforesaid configuration, after the heating medium stored in the heat insulating container is fed to the vaporizer, the circulation of the heating medium is shut off by the circulation shutoff valve, thereby confining the heating medium into the vaporizer. Accordingly, the vaporizer can be heated during engine cold start, using the heat insulating container of comparatively small heat capacity.

According to one embodiment of the invention, the circulation circuit may include a first circulation circuit and a second circulation circuit. The first circulation circuit circulates the heating medium between the vaporizer and the heat insulating container, without passing through the inside of the internal-combustion engine. The second circulation circuit circulates the heating medium between the heat insulating container and the inside of the internal-combustion engine, without passing the vaporizer.

In the aforesaid configuration, the circulation circuit for feeding the heating medium heated inside the engine to the heat insulating container and the circulation circuit for feeding the heating medium from the heat insulating container to the vaporizer are provided independently of each other. These two circulation circuits are independently shut off according to the situation, thereby making it possible to efficiently heat the vaporizer and store the heated heating medium into the heat insulating container.

According to one embodiment of the invention, the heating system may further include a first circulation-circuit shutoff valve that shuts off circulating of the heating medium in the first circulation circuit.

According to this configuration, with the supply of the heating medium to the vaporizer being stopped, the heating medium can be circulated only between the inside of the engine and the heat insulating container. Accordingly, after the heating medium stored in the heat insulating container is fed to the vaporizer, the heating medium can be confined thereinto. Thus, the vaporizer can be heated during engine cold start, using the heat insulating container of comparatively small heat capacity.

According to one embodiment of the invention, the heating system may further include a second circulation-circuit shutoff valve that shuts off circulating of the heating medium in the second circulation circuit.

According to this configuration, with the supply of the heating medium to the vaporizer being stopped, the heating medium can be circulated only between the inside of the engine and the heat insulating container. Accordingly, the vaporizer can be efficiently heated by the heating medium that is thermally insulated and stored in the heat insulating container.

According to one embodiment of the invention, the circulation circuit may further include a third circulation circuit that circulates the heating medium between the vaporizer and the inside of the internal-combustion engine, without passing through the heat insulating container.

In the aforesaid configuration, with the supply of the heating medium to the vaporizer being stopped, the heating medium can be circulated only between the inside of the engine and the heat insulating container. Thus, the vaporizer can be efficiently heated by the heat of the internal combustion engine.

According to one embodiment of the invention, the heating system may further include a three-way valve and first to fifth passages. The three-way valve is disposed in the circulation circuit. The first passage connects one end of a heating-medium passage of the inside of the internal-combustion engine with the three-way valve. The second passage connects the three-way valve with the vaporizer. The third passage connects the three-way valve with the heat insulating container. The fourth passage connects the heat insulating container with the other end of the inside of the internal-combustion engine. The fifth passage connects the vaporizer with the fourth passage.

In the aforesaid configuration, the three-way valve connects the second passage and the third passage together and then shuts off the first passage, thereby forming the circulation circuit (first circulation circuit) that circulates between the heat insulating container and the vaporizer, and not through the inside of the engine. Besides, the three-way valve connects the first passage and the third passage together and then shuts off the second passage, thereby forming the circulation circuit (second circulation circuit) that circulates between the heat insulating container and the inside of the engine, and not through the vaporizer. Furthermore, the three-way valve connects the first passage and the second passage together and then shuts off the third passage, thereby forming a circulation circuit (third circulation circuit) that circulates between the vaporizer and the inside of the engine, and not through the heat insulating container. In addition, when the shutoff valve shuts off the fifth passage, the circulation of the heating medium to the vaporizer is shut off, and the heating medium is confined thereinto.

Therefore, according to the aforesaid configuration, the heating system including the aforesaid first to third circulation circuits and first and second circulation-circuit shutoff valves can be realized in a comparatively simple configuration.

According to one embodiment of the invention, a fuel supply apparatus for a liquefied gas engine, includes a vaporizer, a circulation circuit, a heat insulating container, and a controller. The vaporizer vaporizes liquefied gas fuel. The circulation circuit circulates heating medium between the vaporizer and an internal-combustion engine. The heat insulating container stores the heating medium. The controller confines the heating medium, which is stored in the heat insulating container, in the vaporizer before the internal-combustion engine starts. The controller releases confinement of the heating medium on a basis of an accumulated amount of fuel, which has been vaporized by the vaporizer since the internal-combustion starts.

In this configuration, the high-temperature heating medium in the heat insulating container is confined into the vaporizer before engine start, so that the vaporization of fuel is accelerated by such a heating medium during engine start. Additionally, the high-temperature heating medium supplied during the preceding engine operation is stored in a thermally insulated state in the heat insulating container.

Besides, the confinement of the heating medium is released based on the accumulated amount of fuel vaporized. Therefore, when it is difficult for the heating medium confined in the vaporizer to sufficiently vaporize fuel, the heating medium heated in the engine is supplied to the vaporizer, thereby suitably maintaining the state in which fuel is sufficiently vaporized.

Incidentally, the magnitude of heat energy of cooling water in the vaporizer decreases as the amount of fuel vaporized through the vaporizer increases. Accordingly, it can be figured out, through the accumulated amount of fuel vaporized, whether or not cooling water in the vaporizer has heat energy capable of sufficiently vaporizing fuel.

Thus, according to the aforesaid configuration, fuel can be properly vaporized by the vaporizer even during engine start.

According to one embodiment of the invention, the controller may adopt an accumulated amount of fuel, which has been injected since the heating medium stored in the heat insulating container is confined in the vaporizer, as an index value of the accumulated amount of vaporized fuel. The controller may release the confinement of the heating medium on a basis of a fact that the accumulated amount of injected fuel is equal to or larger than an injection amount determination value.

The aforesaid injection amount determination value is preset as a value for determining whether or not cooling water in the vaporizer is in a state capable of sufficiently vaporizing fuel. When the accumulated amount of the fuel injection amount is larger than or equal to the injection amount determination value, the controller determines that heat energy of cooling water in the vaporizer has a magnitude incapable of sufficiently vaporizing fuel. On the contrary, when the accumulated amount of the fuel injection amount is smaller than the injection amount determination value, the controller determines that heat energy of cooling water in the vaporizer has a magnitude capable of sufficiently vaporizing fuel.

In the aforesaid configuration, the confinement is released based on the result of comparison between the injection amount determination value and the accumulated amount of the fuel injection amount which are set in accordance with such an aspect. Therefore, when it is difficult for the heating medium confined in the vaporizer to accelerate the vaporization of fuel, the heating medium heated in the engine is rapidly supplied to the vaporizer, thereby making it possible to suitably maintain the state in which fuel is sufficiently vaporized through the vaporizer.

According to one embodiment of the invention, the controller may set the injection amount determination value on a basis of a temperature of the heating medium immediately after the heating medium is confined in the vaporizer.

Heat energy of the heating medium is not consumed by the latent heat of vaporization of fuel, immediately after the heating medium is confined into the vaporizer. Therefore, the temperature of the heating medium read at this time can be adopted as an index value of the heat energy of the heating medium.

Thereupon, the injection amount determination value is set in accordance with this embodiment, thereby making it possible to more accurately release the confinement of the heating medium based on the result of comparison between the accumulated amount of the fuel injection amount and the injection amount determination value.

According to one embodiment of the invention, the controller may set the injection amount determination value on a basis of (a) the temperature of the heating medium immediately after the heating medium is confined in the vaporizer and (b) air temperature.

The heating medium confined in the vaporizer is cooled not only by the latent heat of vaporization of fuel but also by the ambient air temperature.

Accordingly, the injection amount determination value is set in accordance with this embodiment, thereby making it possible to more accurately release the confinement of the heating medium.

According to one embodiment of the invention, the controller may adopt an accumulated amount of intake air after the heating medium is confined in the vaporizer, as an index value of the accumulated amount of vaporized fuel. The controller may release the confinement of the heating medium on a basis of a fact that the accumulated amount of intake air is equal to or larger than an intake-air amount determination value.

The intake-air amount determination value is pre-set as a value for determining whether or not cooling water in the vaporizer is capable of sufficiently vaporizing fuel. When the accumulated amount of the intake air amount is larger than or equal to the intake-air amount determination value, the controller determines that heat energy of cooling water in the vaporizer has a magnitude incapable of sufficiently vaporizing fuel. On the contrary, when the accumulated amount of the intake air amount is smaller than the intake-air amount determination value, the controller determines that heat energy of cooling water in the vaporizer has a magnitude capable of sufficiently vaporizing fuel.

Since there is the correlation between the fuel injection amount and the intake air amount, the above-described effects can be obtained even by releasing the confinement of the heating medium based on the result of comparison between the accumulated amount of the intake air amount and the intake-air amount determination value as in the above-described configuration.

According to one embodiment of the invention, the controller may set the intake-air amount determination value on a basis of a temperature of the heating medium immediately after the heating medium is confined in the vaporizer.

The same effects as those of claim 3 of the invention can be exerted even by adopting such a configuration.

According to one embodiment of the invention, the controller may set the intake-air amount determination value on a basis of (a) the temperature of the heating medium immediately after the heating medium is confined in the vaporizer and (b) air temperature.

The same effects as those of claim 4 of the invention can be exerted even by adopting such a configuration.

According to one embodiment of the invention, the circulation circuit may include first to third circulation circuits. The first circulation circuit circulates the heating medium between the vaporizer and the heat insulating container, without passing through the internal-combustion engine. The second circulation circuit circulates the heating medium through the internal-combustion engine, without passing the vaporizer. The third circulation circuit circulates the heating medium between the vaporizer and the internal-combustion engine. The controller may circulate the heating medium in the first circulation circuit and then changes the circulation circuit from the first circulation circuit to the second circulation circuit, to confine the heating medium in the vaporizer. The controller may change the circulation circuit from the second circulation circuit to the third circulation circuit to release the confinement of the heating medium.

In the aforesaid configuration, the heating medium is circulated through the first circulation circuit before engine start, thereby supplying into the vaporizer a high-temperature heating medium in the heat insulating container. And, the circulation circuit is switched from the first circulation circuit to the second circulation circuit, thereby confining the high-temperature heating medium into the vaporizer. Besides, when it is difficult for the heating medium confined in the vaporizer to sufficiently vaporize fuel after engine start, the circulation circuit is switched from the second circulation circuit to the third circulation circuit, thereby releasing the confinement of the heating medium.

According to one embodiment of the invention, a fuel supply apparatus supplies fuel to a liquefied gas engine through an injector. The fuel supply apparatus includes a vaporizer, a heat insulating container, first to third circulation circuits, and a controller. The vaporizer vaporizes liquefied gas fuel to supply vaporized gas fuel to the injector. The heat insulating container stores heating medium heated by the internal-combustion engine. The first circulation circuit circulates the heating medium between the vaporizer and the heat insulating container, without passing through the internal-combustion engine. The second circulation circuit circulates the heating medium through the internal-combustion engine, without passing the vaporizer. The third circulation circuit circulates the heating medium between the vaporizer and the internal-combustion engine. The controller starts to circulate the heating medium through the first circulation circuit on a basis of a fact that the controller detects a start preparation operation of the internal-combustion engine. The controller changes a circulation circuit of the heating medium from the first circulation circuit to the second circulation circuit while allowing the internal-combustion engine to start, on a basis of a fact that the heating medium stored in the heat insulating container is supplied to the vaporizer. The controller calculates an accumulated amount of fuel, which has been injected through the injector from the start of the internal-combustion engine. The controller changes the circulation circuit of the heating medium from the second circulation circuit to the third circulation circuit based on a fact that the accumulated amount of fuel is equal to or larger than an injection amount determination value.

According to one embodiment of the invention, a fuel supply apparatus supplies fuel to a liquefied gas engine through a carburetor. The fuel supply apparatus includes a vaporizer, a heat insulating container, first to third circulation circuits, and a controller. The vaporizer vaporizes liquefied gas fuel to supply vaporized gas fuel to the carburetor. The heat insulating container stores heating medium heated by the internal-combustion engine. The first circulation circuit circulates the heating medium between the vaporizer and the heat insulating container, without passing through the internal-combustion engine. The second circulation circuit circulates the heating medium through the internal-combustion engine, without passing the vaporizer. The third circulation circuit circulates the heating medium between the vaporizer and the internal-combustion engine. The controller starts to circulate the heating medium through the first circulation circuit on a basis of a fact that the controller detects a start preparation operation of the internal-combustion engine. The controller changes a circulation circuit of the heating medium from the first circulation circuit to the second circulation circuit while allowing the internal-combustion engine to start, on a basis of a fact that the heating medium stored in the heat insulating container is supplied to the vaporizer. The controller calculates an accumulated amount of intake air, which has been taken in the internal combustion engine since the internal-combustion engine starts. The controller changes the circulation circuit of the heating medium from the second circulation circuit to the third circulation circuit based on a fact that the accumulated amount of intake air is equal to or larger than an intake-air amount determination value.

According to the aforesaid configurations, the high-temperature heating medium in the heat insulating container is confined into the vaporizer before engine start, so that the vaporization of fuel is accelerated by such a heating medium during engine start. Additionally, the high-temperature heating medium supplied during the preceding engine operation is stored in a thermally insulated state in the heat insulating container.

Besides, the confinement of the heating medium is released based on the accumulated amount of the fuel injection amount (intake air amount) of the engine. Therefore, when it is difficult for the confined heating medium to sufficiently accelerate the vaporization of fuel, the heating medium heated in the engine is supplied to the vaporizer, thereby suitably maintaining the state in which fuel is sufficiently vaporized.

Thus, according to the aforesaid configurations, fuel can be properly vaporized by the vaporizer even during engine start.

DETAILED DESCRIPTION OF THE EMBODIMENT OF THE INVENTION

A first embodiment of a heating system for a liquefied gas fuel supply apparatus of a vehicle-mounted internal combustion engine will hereinafter be described with reference to FIGS. 1 to 6. Additionally, in the liquefied gas fuel supply apparatus of this embodiment, an internal combustion engine is supplied with liquefied petroleum gas (LPG) as its fuel.

Figure 1:
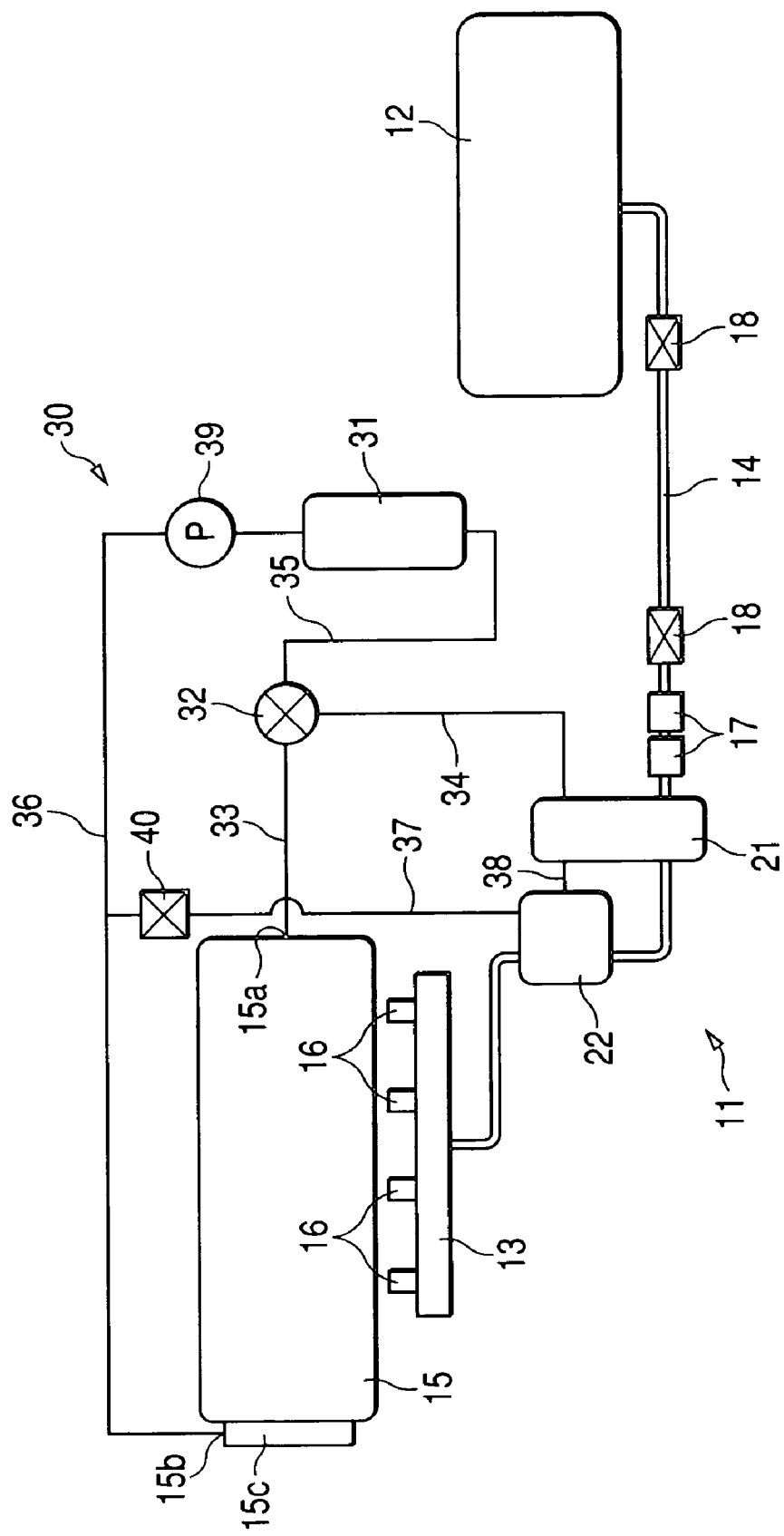
FIG. 1 is a configuration diagram showing a heating system for liquefied gas fuel supply apparatus according to a first embodiment of the invention.

As shown in FIG. 1, a liquefied gas fuel supply apparatus 11 includes a fuel tank 12, a delivery pipe 13, and a fuel passage 14 through which fuel in the fuel tank 12 is supplied to the delivery pipe 13. The delivery pipe 13 is provided with a plurality of injectors 16 that inject and supply fuel into respective combustion chambers (not shown) of an internal combustion engine 15. Additionally, in practice, these injectors 16 are attached to the internal combustion engine 15, but in the figure, for convenience' sake, these injectors 16 are shown spaced from the internal combustion engine 15.

Fuel is hermetically stored in a liquid state in the fuel tank 12. This fuel is pressure-fed through the inside of the fuel passage 14 toward the delivery pipe 13 by a not-shown pump disposed in the fuel tank 12. A regulator 21 for pressure-regulating and vaporizing fuel supplied to the delivery pipe 13 is disposed in the fuel passage 14. The fuel pressure-fed in the liquid state from the fuel tank 12 is pressure-regulated and vaporized by the regulator 21. That is, the regulator 21 functions as a "vaporizer".

Two electric heaters 17, which are made up of PTC heaters and heat fuel so as to accelerate the aforesaid vaporization, are disposed on the upstream of the regulator 21 in the fuel passage 14, i.e., on the fuel tank 12 side. Additionally, two open/close valves 18 capable of shutting off the circulation of fuel are disposed on the upstream of the electric heaters 17 in the fuel passage 14.

A hot-water heater 22 is disposed on the upstream of the regulator 21 in the fuel passage 14, i.e., on the delivery pipe 13 side. The hot-water heater 22 heats fuel in the fuel passage 14 by using the heat of a heating medium supplied thereto, to thus accelerate the vaporization of fuel on the downstream of the regulator 21. In this embodiment, the fuel thus vaporized by both the regulator 21 and the hot-water heater 22 is supplied to the delivery pipe 13.

In the meantime, the regulator 21 and hot-water heater 22 for performing such vaporization are cooled by latent heat of vaporization. However, when these regulator 21 and hot-water heater 22 are excessively cooled, fuel is insufficiently vaporized, which is apt to adversely affect fuel injection control, etc. Thereupon, this embodiment is configured such that, to prevent such excessive cooling, cooling water heated inside the internal combustion engine 15 is used as a heating medium to heat these regulator 21 and hot-water heater 22.

That is, in this embodiment, there is provided a circulation circuit 30 that circulates the cooling water between the regulator 21 and hot-water heater 22 and the inside of the internal combustion engine 15. When this circulation circuit 30 circulates cooling water between the regulator 21 and hot-water heater 22 and the inside of the internal combustion engine 15, then the heat of cooling water heated by the heat of the internal combustion engine 15 is conducted to the regulator 21 and the hot-water heater 22. This makes it possible to efficiently heat the regulator 21 and the hot-water heater 22 by using the heat of the internal combustion engine 15, without particularly generating heat by means of an electric heater for example.

Besides, this embodiment is configured such that, to enable such efficient heating even during engine cold start, a heat insulating container 31 for storing cooling water is disposed in the circulation circuit 30. The heat insulating container 31, made up of a thermos bottle, is configured to be capable of thermally insulating cooling water stored therewithin. That is, cooling water heated during the preceding engine operation is stored in and thermally insulated by this heat insulating container 31, thereby making it possible, even during engine cold start, to efficiently heat the regulator 21 and the hot-water heater 22 by using the heat of such cooling water.

And, the circulation circuit 30 is provided with a three-way valve 32 as means for switching a circulating state, such as storing in the heat insulating container 31 such heat inside the internal combustion engine 15, or supplying the stored heat to the regulator 21 and the hot-water heater 22. That is, the circulation circuit 30 of this embodiment includes this three-way valve 32, the heat insulating container 31, the inside of the internal combustion engine 15, the regulator 21, the hot-water heater 22, a plurality of passages providing communication therebetween, etc.

The plurality of passages include the following. First, between the three-way valve 32 and an outlet 15a of the internal combustion engine 15 which provides one end of a not-shown cooling water passage (heating medium passage) formed inside the internal combustion engine 15, there is provided a first passage 33 providing a connection therebetween. Between the three-way valve 32 and the regulator 21, there is provided a second passage 34 providing a connection therebetween. And, between the three-way valve 32 and the heat insulating container 31, there is provided a third passage 35 providing a connection therebetween. A fourth passage 36 provides a connection between the heat insulating container 31 and an inlet 15b of the internal combustion engine 15 which is the other end of the aforesaid cooling water passage of the internal combustion engine 15. And, between the fourth passage 36 and the hot-water heater 22, there is provided a fifth passage 37 providing a connection therebetween. Additionally, between the regulator 21 and the hot-water heater 22, there is provided a communication path 38 in charge of circulating cooling water therebetween.

The fourth passage 36 is provided with a circulation pump 39 made up of an electric pump for generating a circulating flow in the circulation circuit 30. The circulation pump 39, while being driven, pressure-feeds cooling water so that the cooling water circulates through the fourth passage 36, from the internal combustion engine 15 side to the heat insulating container 31 side. Additionally, with this circulation pump 39 being stopped, although it is natural that the pressure feed by this circulation pump 39 is not performed, the circulation of cooling water via the circulation pump 39 is configured to be allowed in both directions of the fourth passage 36. Besides, the fifth passage 37 is provided with a circulation shutoff valve 40 made up of an electromagnetic valve capable of opening/closing the fifth passage 37.

Additionally, the aforesaid cooling water passage of the internal combustion engine 15 includes a water jacket, etc. which are formed in the internal combustion engine 15 and brought into communication with a radiator. And, a water pump 15c disposed in the internal combustion engine 15 can circulate cooling water between the internal combustion engine 15 and the aforesaid radiator, and can also generate the circulating flow of cooling water in the circulation circuit 30. The water pump 15c performs such pressure feed of cooling water as long as the internal combustion engine 15 is operated.

This embodiment is configured such that the open/closed states of the three-way valve 32 and circulation shutoff valve 40 and the driving state of the circulation pump 39 are controlled based on command signals from a not-shown electronic control unit in charge of various operation controls of the internal combustion engine 15. The aforesaid electronic control unit exerts the aforesaid controls of these valves 32, 40 and circulation pump 39, for example, based on the temperature of cooling water in the internal combustion engine 15 (which is hereinafter called the in-engine water temperature) and the temperature of cooling water in the hot-water heater 22 (which is hereinafter called the in-heater water temperature).

FIGS. 2 to 5 show the respective circulating states of cooling water in the circulation circuit 30, which are switched through such controls by the electronic control unit. Additionally, in these figures, passages of the circulation circuit 30 in which cooling water circulation is generated are indicated by solid lines, and passages thereof in which the cooling water circulation is shut off are indicated by broken lines.

Figure 2:
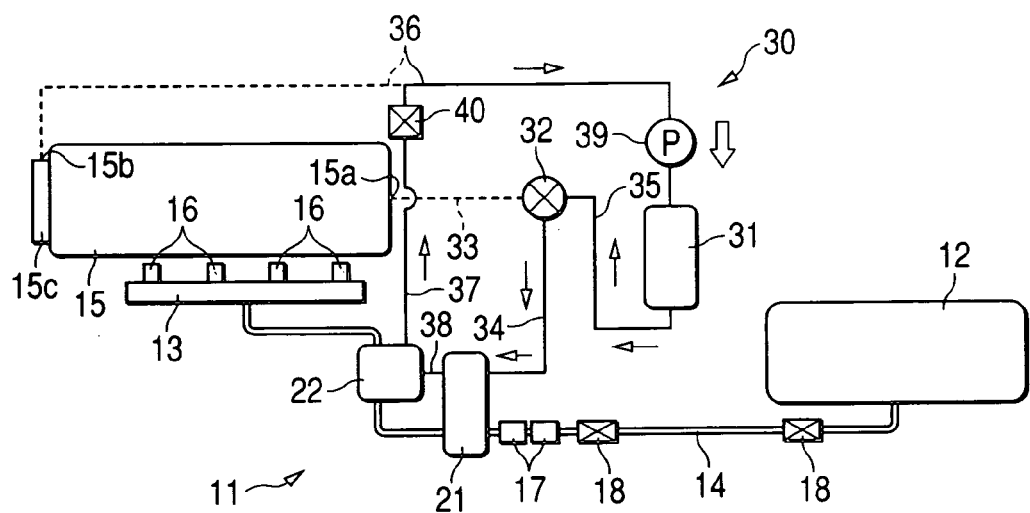
FIG. 2 is a diagram showing a circulating state (first circulation mode) of a circulation circuit.

FIG. 2 shows the state (first circulation mode) in which cooling water circulates between the regulator 21 and hot-water heater 22 and the heat insulating container 31, and not through the inside of the internal combustion engine 15. In this embodiment, the following circuit that performs this circulation is called a "first circulation circuit". That is, the circuit is configured of the circulation pump 39, the heat insulating container 31, the third passages 35, the three-way valve 32, the second passage 34, the regulator 21, the communication path 38, the hot-water heater 22, the fifth passage 37, the circulation shutoff valve 40, and a part of the fourth passage 36.

On this occasion, the three-way valve 32 provides communication between the second passage 34 and the third passage 35, and is placed in a "first state" for shutting off these passages 34, 35 and the first passage 33, and the circulation shutoff valve 40 is placed in an open state. Besides, the circulation pump 39 is driven, and the water pump 15c is stopped (i.e., the internal combustion engine 15 is stopped). That is, in this state, the circulation pump 39 generates the circulating flow of cooling water in the aforesaid first circulation circuit.

The aforesaid electronic control unit exerts the aforesaid control so as to provide this circulating state, for example, immediately before cranking start during engine cold start. Thereby, cooling water heated inside the engine 15 during the preceding engine operation is supplied to the regulator 21 and the hot-water heater 22 from the heat insulating container 31, thus allowing the heat thereof to accelerate the vaporization of fuel.

Figure 3:
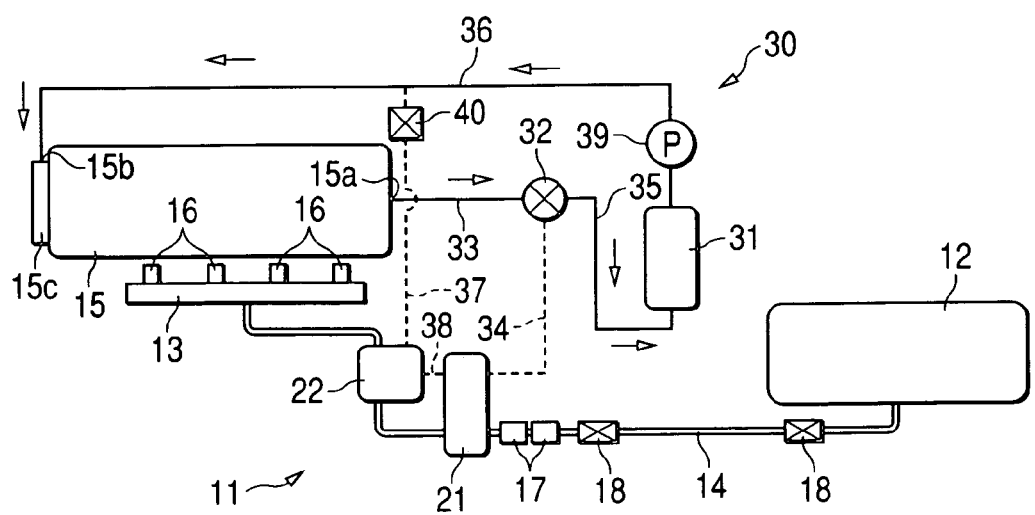
FIG. 3 is a diagram showing a circulating state (second circulation mode) of the circulation circuit.

FIG. 3 shows the state (second circulation mode) in which cooling water circulates between the heat insulating container 31 and the inside of the internal combustion engine 15, and not through the regulator 21 or the hot-water heater 22. In this embodiment, the following circuit that performs this circulation is called a "second circulation circuit". That is, the circuit is configured of the heat insulating container 31, the circulation pump 39, the fourth passage 36, the aforesaid cooling water passage inside the internal combustion engine 15, the first passage 33, the three-way valve 32, and the third passage 35.

On this occasion, the three-way valve 32 provides communication between the first passage 33 and the third passage 35, and is placed in a "second state" for shutting off these passages 33, 35 and the second passage 33, and the circulation shutoff valve 40 is placed in a closed state. Besides, the circulation pump 39 is stopped, and the water pump 15c is driven (i.e., the internal combustion engine 15 is operated). That is, in this state, cooling water is circulated through the aforesaid second circulation circuit by the water pump 15c, and cooling water, which is present in the second passage 34, regulator 21, communication path 38, and hot-water heater 22 and in a portion of the fifth passage 37 nearer the hot-water heater 22 side in relation to the circulation shutoff valve 40, is shut off from circulation and confined into the region thereof.

The aforesaid electronic control unit exerts the aforesaid control so as to provide the aforesaid circulating state, for example, in the period when cranking is performed during engine cold start. Such confinement of cooling water in the regulator 21, hot-water heater 22, etc. is performed, thereby making it possible to avoid the following phenomenon for example. That is, high-temperature cooling water stored in the heat insulating container 31 passes through the regulator 21 and the hot-water heater 22 while continuing to circulate through the aforesaid first circulation circuit, or is cooled in the first circulation circuit, thus preventing the cooling water from sufficiently heating the regulator 21 and the hot-water heater 22. Accordingly, even if the heat insulating container 31 is of small heat capacity, cooling water stored in the heat insulating container 31 is efficiently supplied to the regulator 21 and the hot-water heater 22, without allowing the heat of the cooling water to escape anywhere else, thus making it possible to heat the regulator 21 and the hot-water heater 22.

Additionally, in this embodiment, the three-way valve 32, when placed in the aforesaid first state, functions as a shutoff valve for shutting off the circulation of cooling water in the aforesaid second circulation circuit, i.e., as a "second circulation-circuit shutoff valve". And, when placed in the aforesaid second state, it functions as a shutoff valve for shutting off the circulation of cooling water in the aforesaid first circulation circuit, i.e., as a "first circulation-circuit shutoff valve".

Figure 4:
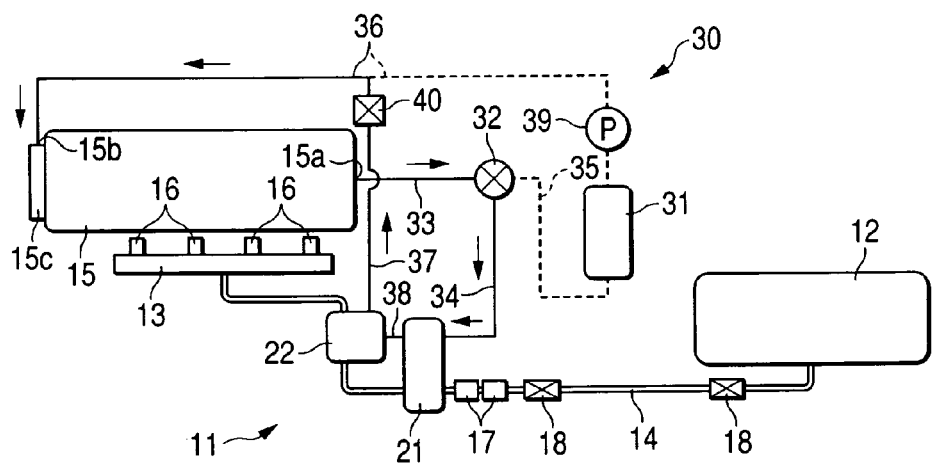
FIG. 4 is a diagram showing a circulating state (third circulation mode) of the circulation circuit.

FIG. 4 shows the state (third circulation mode) in which cooling water circulates between the regulator 21 and hot-water heater 22 and the inside of the internal combustion engine 15, and not through the heat insulating container 31. In this embodiment, the following circuit that performs this circulation is called a "third circulation circuit". That is, the circuit is configured of the aforesaid cooling water passage inside the internal combustion engine 15, the first passage 33, the three-way valve 32, the second passage 34, the regulator 21, the communication path 38, the hot-water heater 22, the fifth passage 37, the circulation shutoff valve 40, and a part of the fourth passage 36 (a portion other than the part thereof in the first circulation circuit).

On this occasion, the three-way valve 32 provides communication between the first passage 33 and the second passage 34, and is placed in a "third state" for shutting off these passages 32, 33 and the third passage 35, and the circulation shutoff valve 40 is placed in the open state. Besides, the circulation pump 39 is stopped, and the water pump 15c is driven. That is, in this state, the water pump 15c generates the circulating flow of cooling water in the aforesaid third circulation circuit.

The aforesaid electronic control unit exerts the aforesaid control so as to provide this circulating state when the aforesaid in-engine water temperature becomes higher than the aforesaid in-heater water temperature, for example, in the middle of engine warm-up. Thereby, while cooling water is being heated inside the internal combustion engine 15, the heated cooling water is supplied intact to the regulator 21 and the hot-water heater 22, thus enabling the heat thereof to continuously heat the regulator 21 and the hot-water heater 22 during engine operation.

Figure 5:
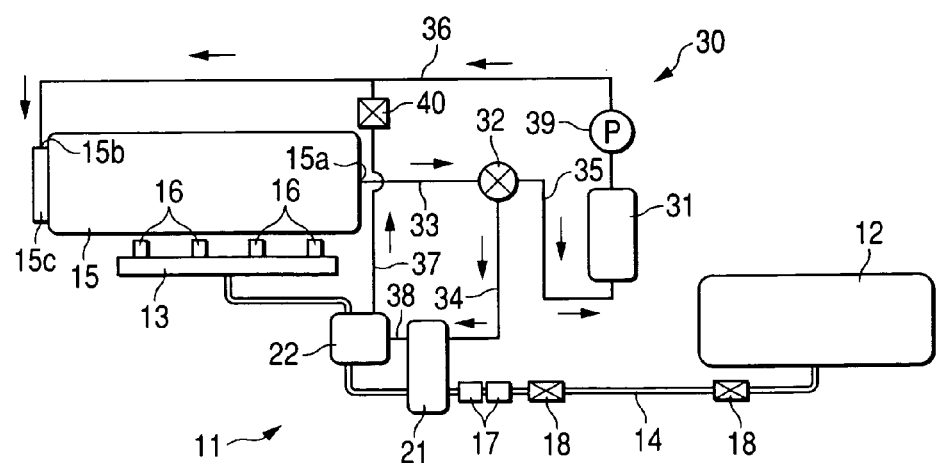
FIG. 5 is a diagram showing a circulating state (fourth circulation mode) of the circulation circuit.

The circulating state shown in FIG. 5 corresponds to the state (fourth circulation mode) in which the circulation in the aforesaid second circulation circuit and the circulation in the aforesaid third circulation circuit occur at the same time.

On this occasion, the three-way valve 32 is placed in a "fourth state" for bringing the first passage 33, second passage 34, and third passage 35 into communication with each other, and the circulation shutoff valve 40 is placed in the open state. Besides, the circulation pump 39 is stopped, and the water pump 15c is driven. That is, in this state, the water pump 15c generates such circulation as described above.

The aforesaid electronic control unit exerts the aforesaid control so as to provide this circulating state when the aforesaid in-engine water temperature becomes higher than a predetermined reference temperature, for example, after completion of engine warm-up. Thereby, similar to the aforesaid circulating state of FIG. 4, the regulator 21 and the hot-water heater 22 can be continuously heated during engine operation, and cooling water heated inside the internal combustion engine 15 is supplied to the heat insulating container 31, thus making it possible to replace cooling water in the heat insulating container 31 with sufficiently high-temperature cooling water.

Figure 6:
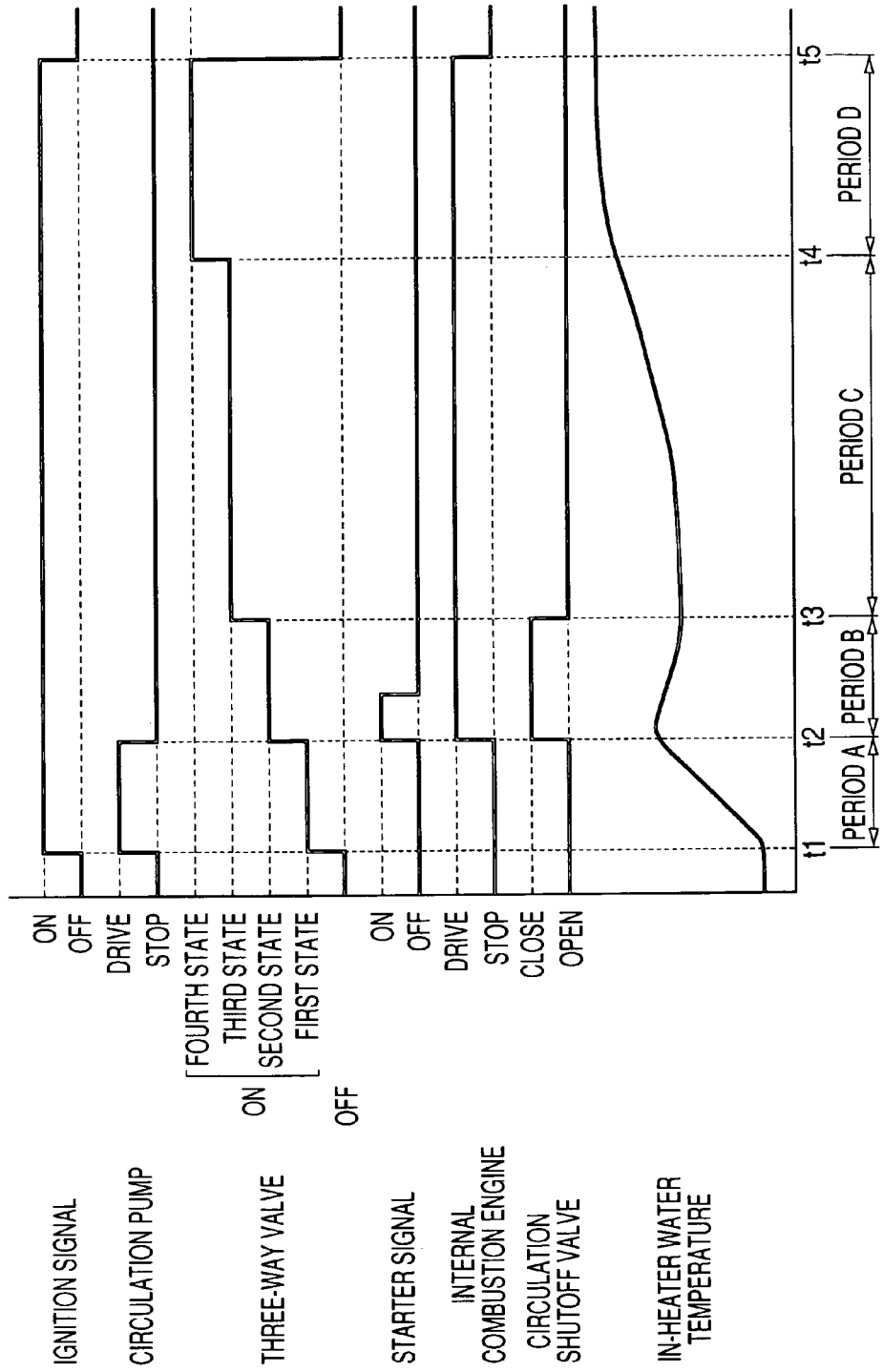
FIG. 6 is a time chart showing an example of switching the circulation states.

An example of the aspect of switching the aforesaid circulating states by the aforesaid electronic control unit will now be described with reference to FIG. 6.

First, when a driver operates to switch an ignition switch of a vehicle into an ON state (time point t1), indicator display, etc. for urging the driver to continue such a switch operation are performed for a predetermined period of time so as to maintain the ignition switch in the ON state. And, simultaneously with the aforesaid switching operation, the circulation pump 39 starts to be driven, and the three-way valve 32 is placed in the aforesaid first state. Thereby, the circulation circuit 30 is placed in the circulating state of FIG. 2. That is, the circulation pump 39 generates the circulating flow of cooling water in the aforesaid first circulation circuit, which causes cooling water heated during the preceding engine operation to flow from the heat insulating container 31 toward the regulator 21 and the hot-water heater 22. And, when this high-temperature cooling water maintained thermally insulated in the heat insulating container 31 reaches the regulator 21 and the hot-water heater 22, the heat thereof heats these regulator 21 and the hot-water heater 22. This heating accelerates the vaporization of fuel in the regulator 21 and the hot-water heater 22 (the above is a period A).

At the time point t1, the length of the "predetermined period of time" to maintain the ON state of the aforesaid ignition switch is set so that cooling water thermally insulated and stored in the heat insulating container 31 can be sufficiently distributed so as to prevent the cooling water from passing through or failing to reach the regulator 21 and the hot-water heater 22.

And, as the aforesaid predetermined period of time elapses, a signal to urge the start of cranking is given through the release of the aforesaid indicator display, etc. When a starter motor is driven by the driver's operation based on such a signal (a starter signal is placed in an ON state), the internal combustion engine 15 is started (time point t2). And, simultaneously therewith, the three-way valve 32 is placed in the aforesaid second state, and the circulation shutoff valve 40 is placed in the open state. Besides, the driving of the circulation pump 39 is stopped.

Thereby, the circulation circuit 30 is placed in the circulating state of FIG. 3. That is, the water pump 15c of the internal combustion pump 15 generates the circulating flow of cooling water in the aforesaid second circulation circuit, while the aforesaid confinement of high-temperature cooling water distributed throughout the regulator 21 and the hot-water heater 22 is performed. Such confinement is performed, thereby making it possible to cause the aforesaid high-temperature cooling water to accumulate in the regulator 21 and the hot-water heater 22 and on the periphery thereof, before causing the high-temperature cooling water to make a circuit of the aforesaid first circulation circuit. Thereby, the heat of the aforesaid cooling water can be efficiently supplied to the regulator 21 and the hot-water heater 22, thus making it possible to sufficiently vaporize fuel, for example, during cranking or immediately after the start of independent operation of the internal combustion engine 15 (the above is a period B).

Additionally, a transition from the aforesaid period A to the aforesaid period B is made on the basis that the ON state of the aforesaid ignition switch is continued for the predetermined period of time. However, the configuration is not limited thereto, and the transition may be made, for example, on the basis that the aforesaid in-heater water temperature has increased to a predetermined temperature.

In the internal combustion engine 15, its own temperature increases (during engine warm-up) as its independent operation is continued, while the regulator 21 and the hot-water heater 22 are cooled by the latent heat of vaporization of fuel. That is, in the regulator 21 and the hot-water heater 22, since cooling water is confined therein as aforesaid, the temperature of cooling water (e.g., the aforesaid in-heater water temperature) shows a decreasing trend.

And, as a result, when the aforesaid in-heater water temperature falls below the aforesaid in-engine water temperature, in other words, when the aforesaid in-engine water temperature becomes higher than the aforesaid in-heater water temperature, then the three-way valve 32 is placed in the aforesaid third state, and the circulation shutoff valve 40 is placed in the open state (time point t3).

Thereby, the circulation circuit 30 is placed in the circulating state of FIG. 4. In this state, the water pump 15c generates the circulating flow of cooling water in the aforesaid third circulation circuit. Accordingly, while cooling water is being heated inside the internal combustion engine 15, the heated cooling water is supplied intact to the regulator 21 and the hot-water heater 22. The heat of this cooling water continuously heats the regulator 21 and the hot-water heater 22 during engine operation. The regulator 21 and the hot-water heater 22 are thus heated by the internal combustion engine 15 having a sufficient heat capacity, thereby increasing the aforesaid in-heater water temperature and maintaining suitable vaporization of fuel in the regulator 21 and the hot-water heater 22 (the above is a period C).

And, when the aforesaid in-engine water temperature becomes higher than the predetermined reference temperature, for example, after completion of engine warm-up, then the three-way valve 32 is placed in the aforesaid fourth state (time point t4).

Thereby, the circulation circuit 30 is placed in the circulating state of FIG. 5. That is, this state provides a circulating sate such that the water pump 15c has simultaneously generated the circulating flow in the aforesaid second circulation circuit and the circulating flow in the aforesaid third circulation circuit. Accordingly, the regulator 21 and the hot-water heater 22 are continuously heated by the heat inside the internal combustion engine 15 as aforesaid, and cooling water heated inside the internal combustion engine 15 is supplied to the heat insulating container 31, thus making it possible to replace the cooling water in the heat insulating container 31 with the highest temperature cooling water (the above is a period D).

And, when the aforesaid ignition switch is placed in an OFF state by the driver, the operation of the internal combustion engine 15 is stopped. In this state, both the water pump 15c and the circulation pump 39 are placed in a stopped state, thus preventing the circulating flow of cooling water from being generated in the heat insulating container 31, so that high-temperature cooling water accumulates in the heat insulating container 31 and thus is thermally insulated and stored therein. This high-temperature cooling water thermally insulated and stored is put to use for heating of the regulator 21 and the hot-water heater 22 for the next engine start.

Additionally, in the aforesaid, at the time point t3, i.e., when the aforesaid in-engine water temperature becomes higher than the aforesaid in-heater water temperature, the circulation circuit is placed in the circulating state of FIG. 4, i.e., the three-way valve 32 is placed in the aforesaid fourth state so as to generate only the circulating flow in the aforesaid third circulation circuit. However, for example, the three-way valve 32 may be placed in the aforesaid fourth state in place of this third state. That is, when the aforesaid in-engine water temperature becomes higher than the aforesaid in-heater water temperature, the circulation circuit 30 may be placed in the circulating state of FIG. 5 where the circulating flow is generated in both the aforesaid second circulation circuit and third circulation circuit. With such a configuration, for example, even when the internal combustion engine 15 is stopped by the driver before the aforesaid in-engine water temperature exceeds the aforesaid reference temperature, cooling water heated inside the internal combustion engine 15 at this stop time point can be stored in the heat insulating container 31.

In the aforesaid aspect in which the circulation circuit 30 is not placed in the circulating state of FIG. 5 unless the aforesaid in-engine water temperature exceeds the aforesaid reference temperature, when the internal combustion engine 15 stops before the aforesaid in-engine water temperature exceeds the aforesaid reference temperature, as shown in FIG. 3, low-temperature cooling water during engine cold start is stored in the heat insulating container 31. Accordingly, as aforesaid, when the aforesaid in-engine water temperature becomes higher than the aforesaid in-heater water temperature, the circulation circuit 30 is placed in the circulating state of FIG. 5, thereby making it possible to further increase the temperature of cooling water in the heat insulating container 31 during such engine stop.

In this embodiment, the following effects can be obtained.

(1) The heat insulating container 31 for storing cooling water is disposed in the circulation circuit 30. According to this configuration, when cooling water is circulated between the regulator 21 and hot-water heater 22 and the inside of the internal combustion engine 15, the heat of cooling water heated by the heat of the internal combustion engine 15 is conducted to the regulator 21 and the hot-water heater 22. Therefore, the regulator 21 and the hot-water heater 22 can be efficiently heated by using the heat of the internal combustion engine 15.

Besides, the heated cooling water is stored in the heat insulating container 31 and thermally insulated even during engine stop. This thermally insulated cooling water is supplied to the regulator 21 and the hot-water heater 22, thereby making it possible to heat the regulator 21 and the hot-water heater 22 even during engine cold start. Accordingly, the regulator 21 and the hot-water heater 22 can be efficiently heated even during engine cold start.

(2) In this embodiment, it is possible to selectively form the following circulation circuits: the "first circulation circuit" that circulates cooling water between the regulator 21 and hot-water heater 22 and the heat insulating container 31, and not through the inside of the internal combustion engine 15; and the "second circulation circuit" that circulates cooling water between the heat insulating container 31 and the inside of the internal combustion engine 15, and not through the regulator 21 or the hot-water heater 22. That is, this embodiment is configured such that the circulation circuit for feeding cooling water heated inside the internal combustion engine 15 to the heat insulating container 31 and the circulation circuit for feeding the cooling water from the heat insulating container 31 to the regulator 21 and the hot-water heater 22 are provided independently of each other. These two circulation circuits are independently shut off according to the situation, thereby making it possible to efficiently heat the regulator 21 and the hot-water heater and store the heated cooling water into the heat insulating container 31.

And, this embodiment is configured such that both such shutoff of the circulation of cooling water in the aforesaid first circulation circuit and such shutoff of the circulation of cooling water in the aforesaid second circulation circuit are selectively performed using the three-way valve 32. Accordingly, when the circulation of cooling water in the aforesaid first circulation circuit is shut off, after cooling water stored in the heat insulating container 31 is fed to the regulator 21 and the hot-water heater 22, the cooling water can be confined thereinto. As a result, the regulator 21 and hot-water-heater 22 can be heated during engine cold start, using the heat insulating container 31 of comparatively small heat capacity. Besides, when the circulation of cooling water in the aforesaid second circulation circuit is shut off, the regulator 21 and the hot-water heater 22 can be efficiently heated by cooling water thermally insulated and stored in the heat insulating container 31.

This embodiment is configured such that the three-way valve 32 function as both the "first circulation-circuit shutoff valve" and the "second circulation-circuit shutoff valve", thus making it possible to realize, in a comparatively simple configuration, a heating system having such a plurality of circulation-circuit shutoff valves.

(3) The circulation shutoff valve 40 for shutting off the circulation of cooling water to the regulator 21 and the hot-water heater 22 is disposed in the fifth passage 37 of the circulation circuit 30. According to this configuration, after cooling water stored in the heat insulating container 31 is fed to the regulator 221 and the hot-water heater 22, the circulation of cooling water is shut off in the circulation shutoff valve 40, thereby confining the cooling water within the regulator 21 and within the hot-water heater 22.

(4) The circulation circuit 30 further includes the "third circulation circuit" that circulates cooling water between the regulator 21 and hot-water heater 22 and the inside of the internal combustion engine 15, and not through the heat insulating container 31. According to this configuration, with the circulation of cooling water to the heat insulating container 21 being stopped, cooling water is circulated only between the inside of the internal combustion engine 15 and the regulator 21 and hot-water heater 22. Thus, the regulator 21 and the hot-water heater 22 can be efficiently heated by the heat of the internal combustion engine 15.

Additionally, the embodiment is not limited to the aforesaid, but maybe be configured, for example, in the following aspects.

The circulation shutoff valve 40 need not necessarily be disposed. For example, with this circulation shutoff valve 40 omitted, cooling water may be confined into the regulator 21, hot-water heater 22, etc. only by the three-way valve 32.

The aforesaid embodiment is configured such that, as shown in FIG. 3, cooling water is confined into the regulator 21 and the hot-water heater 22, but this is not necessarily required. For example, the starter motor may be driven to perform engine start when the circulating flow of cooling water in the aforesaid first circulation circuit is generated.

In the aforesaid embodiment, for example, with the three-way valve 32 omitted, the first to third passages 33, 34, and 35 may be always brought into communication with each other. In this case, for example, during the driving of the circulation pump 39, the regulator 21 and the hot-water heater 22 are heated by cooling water supplied via the second passage 34 to the regulator 21 and the hot-water heater 22, out of cooling water pressure-fed from the heat insulating container 31 to the third passage 35 side. In this case, the circulation shutoff valve 40 may be omitted together with the aforesaid three-way valve 32, but it doesn't matter whether the circulation shutoff valve 40 may be omitted or not.

The aforesaid embodiment is configured such that a part of the circulation circuit 30 is shared among the aforesaid first circulation circuit, second circulation circuit, and third circulation circuit. However, for example, these circulation circuits each may be formed so as not to have such a common portion. And, circulation-circuit shutoff valves for shutting off the circulation of cooling water in these respective circulation circuits may be disposed separately.

The hot-water heater 22 need not necessarily be disposed. For example, with this hot-water heater 22 omitted, fuel may be heated by cooling water only in the regulator 21.

The heat insulating container 31 is not limited to the one made up of the thermos bottle, but may adopt any other configuration capable of thermally insulating cooling water.

In the aforesaid embodiment, cooling water is used as the heating medium, but any other heating medium may be used.

The aforesaid embodiment adopts liquefied petroleum gas (LPG) as fuel supplied to the internal combustion engine 15 in the liquefied gas fuel supply apparatus 11, but is not limited thereto, and may adopt compressed natural gas (CNG), dimethyl ether (DME), etc.

Second Embodiment

A second embodiment of the invention will be described with reference to FIGS. 7 to 17.

In this embodiment, the invention is embodied as a fuel supply apparatus for a liquefied gas engine using liquefied petroleum gas (LPG).

<Configuration of Entire Apparatus>

Figure 7:
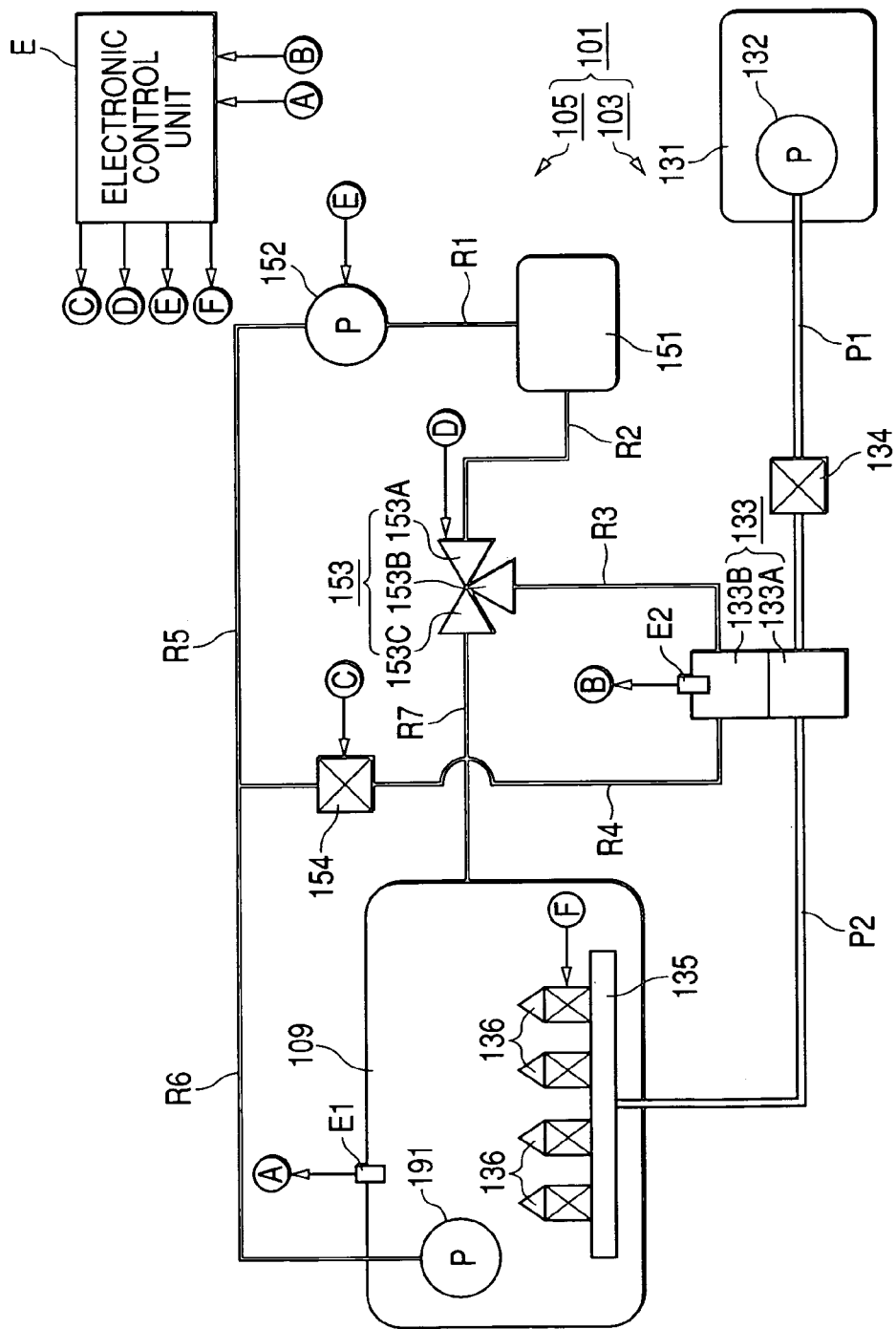
FIG. 7 is a configuration diagram showing the entire configuration of a fuel supply apparatus for liquefied gas engine according to a second embodiment of the invention.

FIG. 7 shows the configuration of the fuel supply apparatus of the liquefied gas engine.

A liquefied gas fuel supply apparatus 100 including a fuel injection mechanism 103 for supplying fuel to an internal combustion engine 109 and a cooling water circulation mechanism 105 for circulating cooling water (heating medium) of the internal combustion engine 109. The internal combustion engine 109 and the liquefied gas fuel supply apparatus 100 are controlled through an electronic control unit E. Additionally, control means includes the electronic control unit E.

<Configuration of Fuel Injection Mechanism>

The fuel injection mechanism 103 includes the following components.

A fuel tank 131 stores fuel in a hermetic manner. Additionally, liquid-phase fuel and vapor-phase fuel are present in the fuel tank 131.

A fuel pump 132 pumps the liquid-phase fuel from within the fuel tank 131 and discharges it to a regulator 133 (vaporizer) side.

A first fuel passage P1 provides a connection between the fuel pump 132 and the regulator 133.

An open/close valve 134 switches the first fuel passage P1 between its open and closed states.

The regulator 133 pressure-regulates and vaporizes the liquid-phase fuel supplied through the fuel pump 132. The regulator 133 is provided with a fuel chamber 133A for vaporizing fuel and a cooling water chamber 133B for storing cooling water.

A second fuel passage P2 provides a connection between the regulator 133 and a delivery pipe 135.

The delivery pipe 135 distributes fuel to each injector 136.

The injector 136 supplies the vapor-phase fuel to a combustion chamber of the internal combustion engine 109.

<Configuration of Cooling Water Circulation Mechanism>

The cooling water circulation mechanism 105 includes a heat insulating container 151 that thermally insulates fuel stored therewithin, a circulation pump 152 that circulates cooling water, a three-way valve 53 that switches a cooling water circulation route, and a circulation shutoff valve 154 that opens/closes a part of the cooling water circulation route.

In the cooling water circulation mechanism 105, a cooling water circulation circuit is formed through the following cooling water passages.

A first cooling water passage R1 provides a connection between a discharge port of the circulation pump 152 and the heat insulating container 151.

A second cooling water passage R2 provides a connection between the heat insulating container 151 and a first port 153A of the three-way valve 153.

A third cooling water passage R3 provides a connection between a second port 153B of the three-way valve 153 and an inlet of the cooling water chamber 133B of the regulator 133.

A fourth cooling water passage R4 provides a connection between an outlet of the cooling water chamber 133B of the regulator 133 and a fifth cooling water passage R5 and sixth cooling water passage R6.

The fifth cooling water passage R5 provides a connection between the fourth cooling water passage R4 and sixth cooling water passage R6 and an inlet port of the circulation pump 152.

The sixth cooling water passage R6 provides a connection between an inlet port of a water pump 191 of the internal combustion engine 109 and the fourth cooling water passage R4 and fifth cooling water passage R5.

A seventh cooling water passage R7 provides a connection between a third port 153C of the three-way valve 153 and a cooling water path formed inside the internal combustion engine 109. Additionally, the cooling water path formed inside the internal combustion engine 109 includes a water jacket, etc. which are brought into communication with a radiator.

The performance of each components disposed in the cooling water circulation circuit will be described.

The circulation pump 152, while being driven, discharges cooling water on the internal combustion engine 109 side toward the heat insulating container 151. On the contrary, the circulation pump 152, while being stopped, does not discharge cooling water, but allows cooling water to circulate between the first cooling water passage R1 and the fifth cooling water passage R5.

The three-way valve 153 can switch a circulating state to any one of a "first state", "second state", "third state", and "fourth state" which are described below.

[A] In the first state, cooling water is circulated between the second cooling water passage R2 and the third cooling water passage R3, while cooling water is not circulated between these cooling water passages R2, R3 and the seventh cooling water passage R7.

[B] In the second state, cooling water is circulated between the second cooling water passage R2 and the seventh cooling water passage R7, while cooling water is not circulated between these cooling water passages R2, R7 and the third cooling water passage R3.

[C] In the third state, cooling water is circulated between the seventh cooling water passage R7 and the third cooling water passage R3, while cooling water is not circulated between these cooling water passages R7, R3 and the second cooling water passage R2.

[D] In the fourth state, cooling water is circulated between the third cooling water passage R3 and the seventh cooling water passage R7.

The circulation shutoff valve 154, when in an open state, opens the fourth cooling water passage R4. On the contrary, the circulation shutoff valve 154, when in a closed state, closes the fourth cooling water passage R4.

The water pump 191 of the internal combustion engine 109 circulates cooling water between the internal combustion engine 109 and the radiator. Besides, the water pump 191 circulates cooling water even in the cooling water circulation mechanism 105. Additionally, the water pump 191 can circulate cooling water only during operation of the internal combustion engine 109.

The electronic control unit E controls the driving state of the circulation pump 152 and the open/closed states of the three-way valve 153 and circulation shutoff valve 154, based on the operating situation, etc. of the internal combustion engine 109.

The electronic control unit E includes a CPU that executes computation as to engine control, a memory for storing a program and information that are necessary for the engine control, and an input port and output port for inputting/outputting signals to the external.

The following various sensors that detect the operating situation of the internal combustion engine 109 are connected to the input port of the electronic control unit E.

An internal combustion engine water temperature sensor E1, disposed in the cooling water path inside the internal combustion engine 109, detects the temperature (engine cooling water temperature TWE) of cooling water circulating in the aforesaid cooling water path.

A regulator water temperature sensor E2, disposed in the cooling water chamber 133B of the regulator 133, detects the temperature (regulator cooling water temperature TWR) of cooling water in the cooling water chamber 133B.

The circulation pump 152, three-way valve 153, circulation shutoff valve 154, injector 136, etc. are connected to the output port of the electronic control unit E. The electronic control unit E controls the open valve time of the injector 136, based on the operating state of the internal combustion engine 109, and thereby adjusts a fuel injection amount from the injector 136.

<Circulation Mode of Cooling Water Circulation Mechanism>

In the cooling water circulation mechanism 105, as shown in FIGS. 8 to 11, a cooling water circulation mode is switched in response to the state of the three-way valve 153. In each figure, passages in which the flow of cooling water is generated are indicated by solid lines, and passages in which the flow of cooling water is not generated are indicated by broken lines. Besides, an arrow on each passage indicates the direction of cooling water circulation.

The circulation mode shown in each figure will hereinafter be called as follows.

Figure 8:
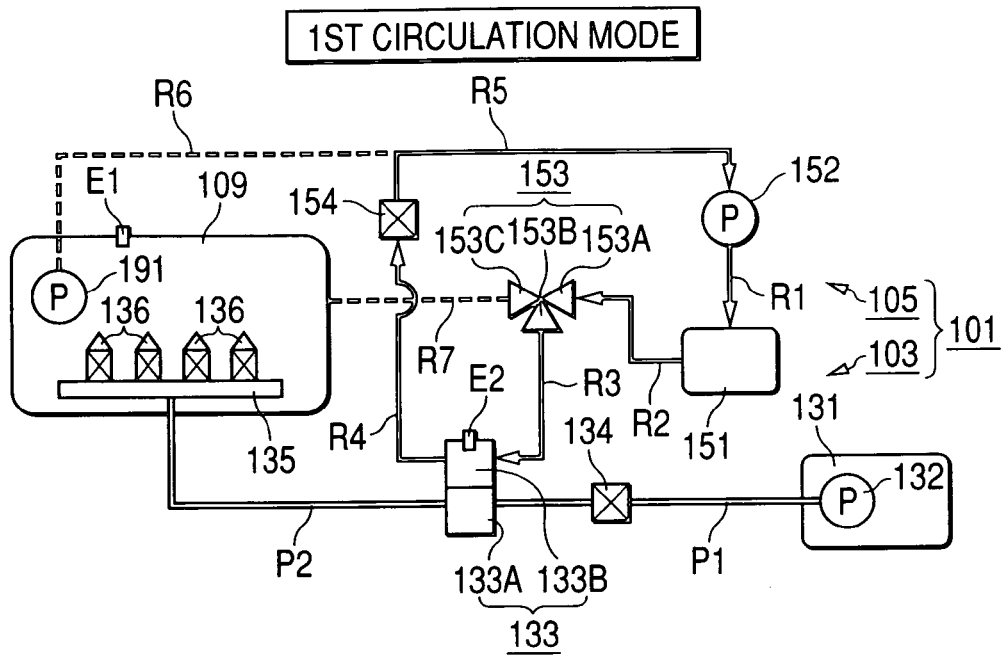
FIG. 8 is an operational diagram showing one of circulation modes of the fuel supply apparatus for liquefied gas engine according to the second embodiment.
Figure 9:
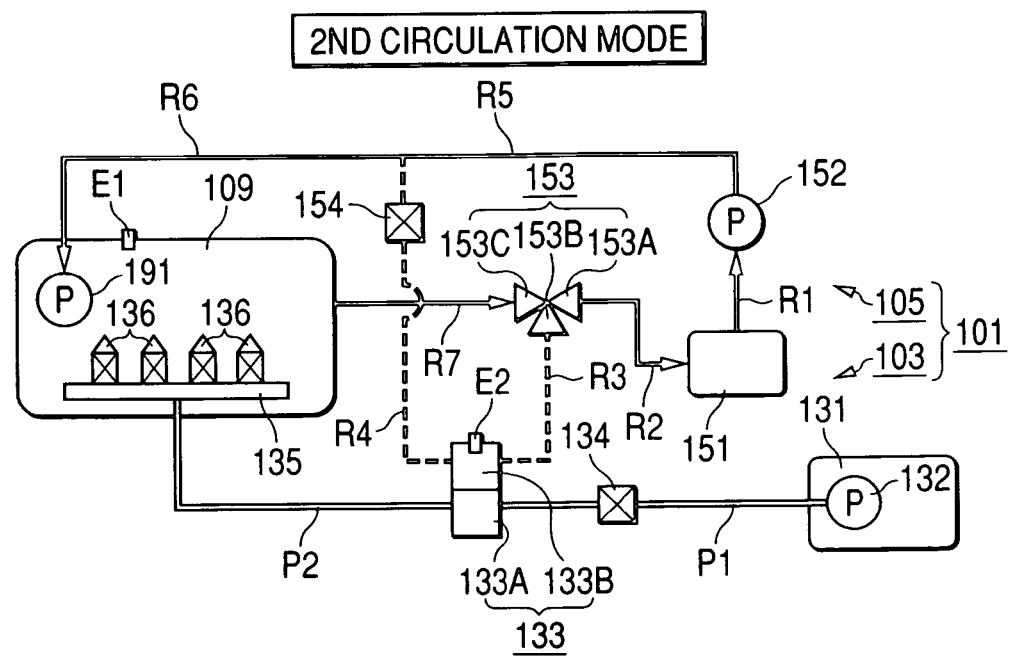
FIG. 9 is an operational diagram showing one of the circulation modes of the fuel supply apparatus for liquefied gas engine according to the second embodiment.
Figure 10:
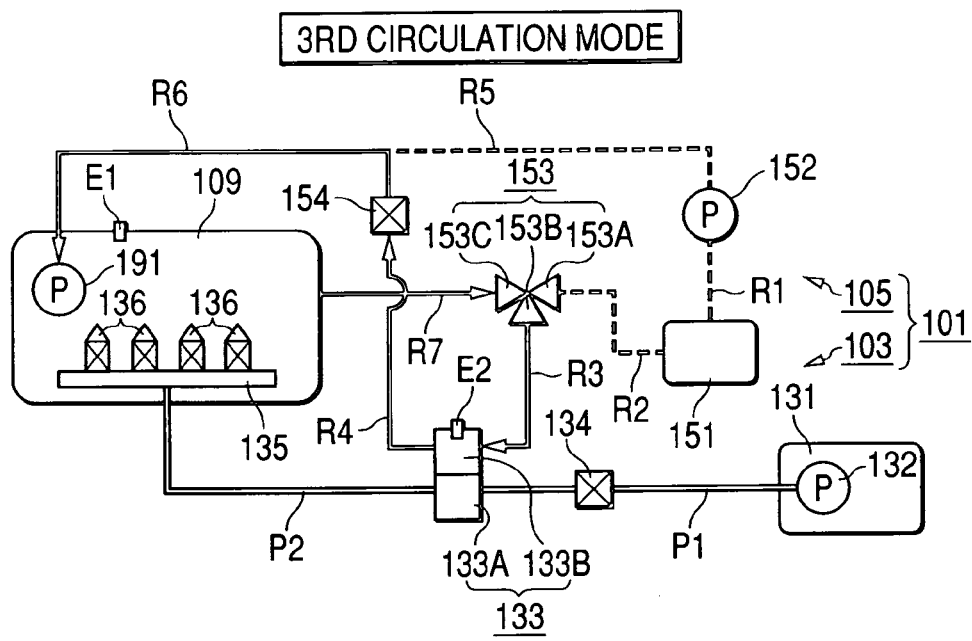
FIG. 10 is an operational diagram showing one of the circulation modes of the fuel supply apparatus for liquefied gas engine according to the second embodiment.
Figure 11:
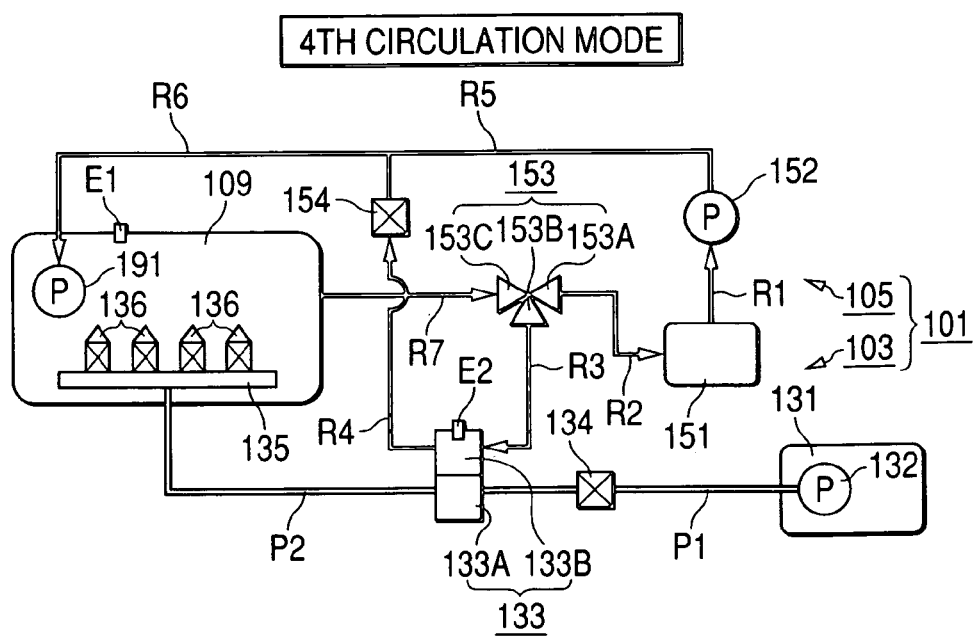
FIG. 11 is an operational diagram showing one of the circulation modes of the fuel supply apparatus for liquefied gas engine according to the second embodiment.

The circulation mode of FIG. 8 is called a first circulation mode.
The circulation mode of FIG. 9 is called a second circulation mode.
The circulation mode of FIG. 10 is called a third circulation mode.
The circulation mode of FIG. 11 is called a fourth circulation mode.

[1] "First Circulation Mode"

As shown in FIG. 8, in the first circulation mode, cooling water circulates between the regulator 133 and the heat insulating container 151, and not via the inside of the internal combustion engine 109. In this circulation mode, a cooling water circulation circuit is configured of the circulation pump 152, first cooling water passage R1, heat insulating container 151, second cooling water passage R2, three-way valve 153, third cooling water passage R3, regulator 133, fourth cooling water passage R4, and fifth cooling water passage R5. This circulation circuit is hereinafter called a first circulation circuit.

In the first circulation mode, the three-way valve 153 and the circulation shutoff valve 154 are maintained in the following states.

The three-way valve 153 is maintained in a first state.
The circulation shutoff valve 154 is maintained in the open state.

Besides, the circulation pump 152 and the water pump 191 are maintained in the following driving states.

The circulation pump 152 is maintained in a driven state.
The water pump 191 is maintained in a stopped state.

That is, in the first circulation mode, the flow of cooling water is formed through the circulation pump 152. Accordingly, cooling water circulates in the direction indicated by the arrows in FIG. 8.

[2] "Second Circulation Mode"

As shown in FIG. 9, in the second circulation mode, cooling water circulates between the heat insulating container 151 and the inside of the internal combustion engine 109, and not via the regulator 133. In this circulation mode, a cooling water circulation circuit is formed of the water pump 191, cooling water path inside the internal combustion engine 109, seventh cooling water passage R7, three-way valve 153, second cooling water passage R4, heat insulating container 151, first cooling water passage R1, circulation pump 152, fifth cooling water passage R5, and sixth cooling water passage R6. This circulation circuit is hereinafter called a second circulation circuit.

In the second circulation mode, the three-way valve 153 and the circulation shutoff valve 154 are maintained in the following states.

The three-way valve 153 is maintained in the second state.
The circulation shutoff valve 154 is maintained in the closed state.

Besides, the circulation pump 152 and the water pump 191 are maintained in the following driving states.

The circulation pump 152 is maintained in a stopped state.
The water pump 191 is maintained in a driven state.

That is, in the second circulation mode, the flow of cooling water is formed through the water pump 191. Accordingly, cooling water circulates in the direction indicated by the arrows in FIG. 9.

[3] "Third Circulation Mode"

As shown in FIG. 10, in the third circulation mode, cooling water circulates between the inside of the internal combustion engine 109 and the regulator 133, and not via the heat insulating container 151. In this circulation mode, a cooling water circulation circuit is formed of the water pump 191, cooling water path inside the internal combustion engine 109, seventh cooling water passage R7, three-way valve 153, third cooling water passage R3, regulator 133, fourth cooling water passage R4, and sixth cooling water passage R6. This circulation circuit is hereinafter called a third circulation circuit.

In the third circulation mode, the three-way valve 153 and the circulation shutoff valve 154 are maintained in the following states.

The three-way valve 153 is maintained in the third state.
The circulation shutoff valve 154 is maintained in the open state.

Besides, the circulation pump 152 and the water pump 191 are maintained in the following driving states.

The circulation pump 152 is maintained in the stopped state.
The water pump 191 is maintained in the driven state.

That is, in the third circulation mode, the flow of cooling water is formed through the water pump 191. Accordingly, cooling water circulates in the direction indicated by the arrows in FIG. 10.

[4] "Fourth Circulation Mode"

As shown in FIG. 11, in the fourth circulation mode, cooling water circulates between the inside of the internal combustion engine 109, the regulator 133, and the heat insulating container 151. That is, the fourth circulation mode corresponds to the state in which the cooling water circulation in the second circulation mode and the cooling water circulation in the third circulation mode are formed at the same time.

In this circulation mode, the third circulation circuit is formed of the water pump 191, seventh cooling water passage R7, three-way valve 153, third cooling water passage R3, regulator 133, fourth cooling water passage R4, and sixth cooling water passage R6. Besides, the second circulation circuit is formed of the water pump 191, seventh cooling water passage R7, three-way valve 153, second cooling water passage R2, heat insulating container 151, first cooling water passage R1, circulation pump 152, fifth cooling water passage R5, and sixth cooling water passage R6. This circulation circuit is hereinafter called a fourth circulation circuit.

In the fourth circulation mode, the three-way valve 153 and the circulation shutoff valve 154 are maintained in the following states.

The three-way valve 153 is maintained in the fourth state.
The circulation shutoff valve 154 is maintained in the fourth state.

Besides, the circulation pump 152 and the water pump 191 are maintained in the following driving states.

The circulation pump 152 is maintained in the stopped state.
The water pump 191 is maintained in the driven state.

That is, in the fourth circulation mode, the flow of cooling water is formed through the water pump 191.

Accordingly, cooling water circulates in the direction indicated by the arrows in FIG. 11.

<Cooling Water Circulation Mode Switching Aspect>

The electronic control unit E switches the circulation mode of the cooling water circulation mechanism 105, based on the conditions shown below.

[1] "Switching to First Circulation Mode"

The electronic control unit E switches the circulation mode of the cooling water circulation mechanism 105 to the first circulation mode, on the basis of detecting a start preparation operation of the internal combustion engine 109. That is, the cooling water circulation circuit is switched from a pre-selected circulation circuit to the first circulation circuit on the basis that the start preparation operation of the internal combustion engine 109 is detected. Additionally, the start preparation operation of the internal combustion engine 109 refers to an operation that is performed to the vehicle through the driver until the internal combustion engine 109 starts.

Thereby, high-temperature cooling water stored in the heat insulating container 151 during the preceding operation of the internal combustion engine 109 is supplied to the regulator 133 from the heat insulating container 151, and low-temperature cooling water accumulating in the regulator 133 is pushed out from the regulator 133.

Besides, when the cooling water circulation mechanism 105 is driven in the first circulation mode, the electronic control unit E puts on hold the start of the internal combustion engine 109 when detecting that the ignition switch is switched to "START" by driver's operation. And, the electronic control unit E allows the start of the internal combustion engine 109 on the basis that high-temperature cooling water stored in the heat insulating container 151 is sufficiently supplied into the cooling water chamber 133B of the regulator 133.

This avoids the situation in which the internal combustion engine 109 is started before high-temperature cooling water is supplied to the regulator 133. Additionally, while the start of the internal combustion engine 109 is on hold, the driver is notified of start waiting through an indicating light for example, thereby allowing the driver to recognize that the internal combustion engine 109 is in a normal state.

[2] "Switching to Second Circulation Mode"

After, in the first circulation mode, high-temperature cooling water stored in the heat insulating container 151 is sufficiently supplied into the cooling water chamber 133B of the regulator 133, the electronic control unit E switches the circulation mode of the cooling water circulation mechanism 105 from the first circulation mode to the second circulation mode, together with the start of the internal combustion engine 109 (or immediately after the start thereof). Additionally, the cooling water circulation circuit is switched from the first circulation circuit to the second circulation circuit on the basis that high-temperature stored in the heat insulating container 151 is sufficiently supplied into the cooling water chamber 133B of the regulator 133.

Thereby, prior to the start of the internal combustion engine 109, high-temperature cooling water stored in the heat insulating container 151 is confined into the regulator 133, thus accelerating the vaporization of fuel through the heat of this cooling water during the start of the internal combustion engine 109. Besides, the confinement of cooling water into the regulator 133 avoids the situation in which high-temperature cooling water passes through the regulator 133, thus efficiently supplying high-temperature cooling water to the regulator 133.

[3] "Switching to Third Circulation Mode"

On the basis that, in the second circulation mode, the state turns out to be that fuel cannot be sufficiently vaporized by cooling water confined in the regulator 133, the electronic control unit E switches the circulation mode of the cooling water circulation mechanism 105 to the third circulation mode. That is, on the basis that the state turns out to be that fuel cannot be sufficiently vaporized by cooling water confined in the regulator 133, the cooling water circulation circuit is switched from the second circulation circuit to the third circulation circuit.

Thereby, the confinement of cooling water into the regulator 133 is released, and cooling water heated inside the internal combustion engine 109 is supplied to the regulator 133, thus suitably maintaining a state capable of sufficiently vaporizing fuel.

[4] "Switching to Fourth Circulation Mode"

On the basis that, in the third circulation mode (or second circulation mode), cooling water is placed in a state capable of accelerating the vaporizing fuel during the next start of the internal combustion engine 109, the electronic control unit E switches the circulation mode of the cooling water circulation mechanism 105 to the fourth circulation mode. That is, on the basis that cooling water is placed in the state capable of accelerating the vaporization of fuel during the next start of the internal combustion engine 109, the cooling water circulation circuit is switched from the third circulation circuit to the fourth circulation circuit.

Thereby, cooling water heated in the internal combustion engine 109 is supplied to the regulator 133 and the heat insulating container 151, thus securing the state capable of accelerating the vaporization of fuel during the next start of the internal combustion engine 109.

<Release of Confinement of Cooling Water>

In the liquefied gas fuel supply apparatus 100, when the confinement of cooling water is not properly released by switching the circulation mode from the second mode to the third mode, fuel is prevented from being sufficiently vaporized due to a reduction in the vaporization performance of the regulator 133.

Thereupon, this embodiment is configured such that the aforesaid problem is solved by releasing the confinement of cooling water, based on the accumulated amount of fuel heated through the regulator 133 after cooling water is confined into the regulator 133.

Incidentally, when fuel is vaporized in the regulator 133, the heat energy of cooling water in the regulator 133 is consumed by the latent heat of vaporization of fuel. Therefore, the heat energy of cooling water in the regulator 133 decreases as the accumulated amount of fuel heated through the regulator 133 increases. Accordingly, through the accumulated amount of fuel heated in the regulator 133, it can be estimated whether or not cooling water confined in the regulator 133 has heat energy capable of sufficiently vaporizing fuel.

Specifically as to the aforesaid release of the confinement of cooling water, the accumulated amount of an amount of fuel injected is used as an index value of the accumulated amount of fuel vaporized through the regulator 133, and switching from the second circulation mode to the third circulation mode is performed based on the result of comparison between this accumulated amount and an injection amount determination value. That is, the accumulated amount of fuel injected through the injector 136 after the start of internal combustion engine 109 (fuel injection amount integration value FSUM) is calculated, and the confinement of cooling water is released on the basis that this fuel injection amount integration value FSUM is higher than or equal to a determination injection amount integration value FSUMX (injection amount determination value).

The aforesaid determination injection amount integration value FSUMX is set as a value for determining whether or not cooling water confined in the regulator 133 has heat energy capable of sufficiently vaporizing fuel. When the fuel injection amount integration value FSUM is lower than the determination injection amount integration value FSUMX, the state is that fuel can be sufficiently vaporized by the heat energy of cooling water in the regulator 133. On the contrary, when the fuel injection amount integration value FSUM is higher than or equal to the determination injection amount integration value FSUMX, the state is that fuel cannot be sufficiently vaporized by the heat energy of cooling water in the regulator 133.

Thereby, when the vaporization of fuel cannot be accelerated by cooling water confined in the regulator 133, cooling water heated in the internal combustion engine 109 is rapidly supplied to the regulator 133, thus suitably maintaining the state in which fuel is sufficiently vaporized.

<Circulation Mechanism Control Process>

In this embodiment, the driving mode of the cooling water circulation mechanism 105 is controlled through a "circulation mechanism control process". Additionally, this process is executed through the electronic control unit E.

Figure 12:
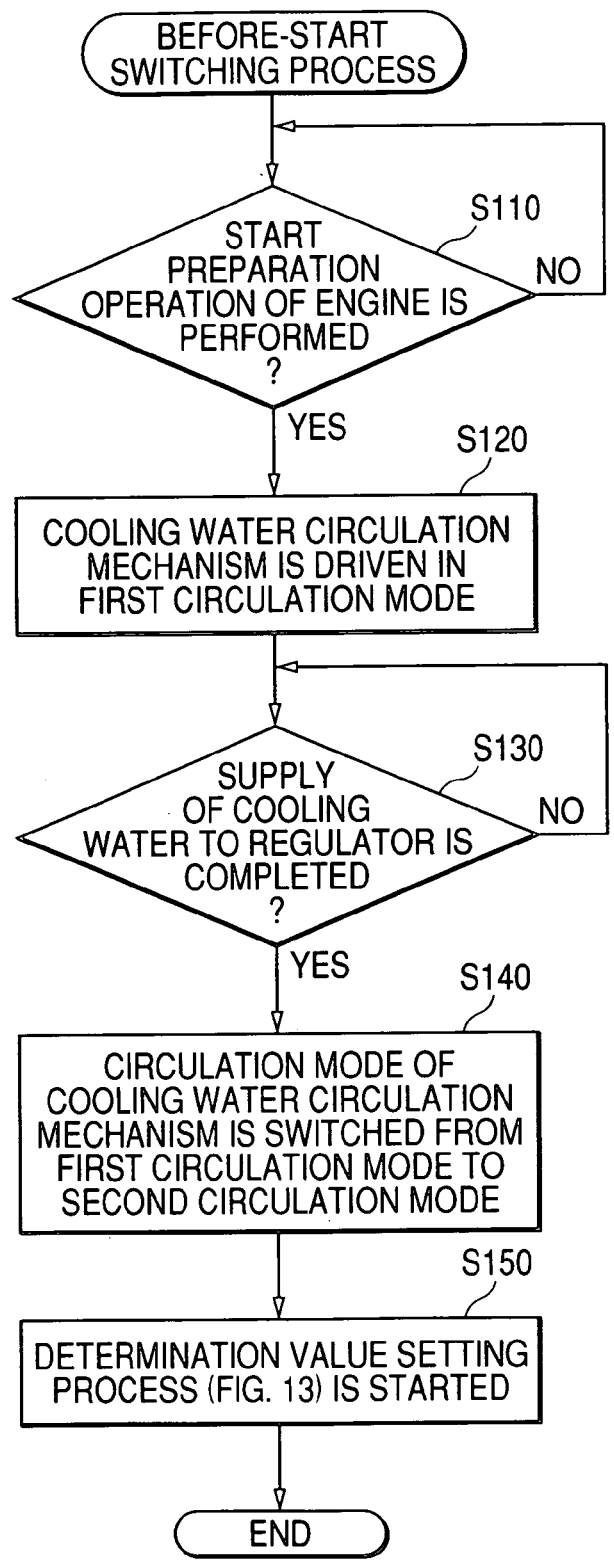
FIG. 12 is a flowchart showing the procedure of processing a "before-start switching process" executed as a part of a "circulation mechanism control process" in the second embodiment.
Figure 13:
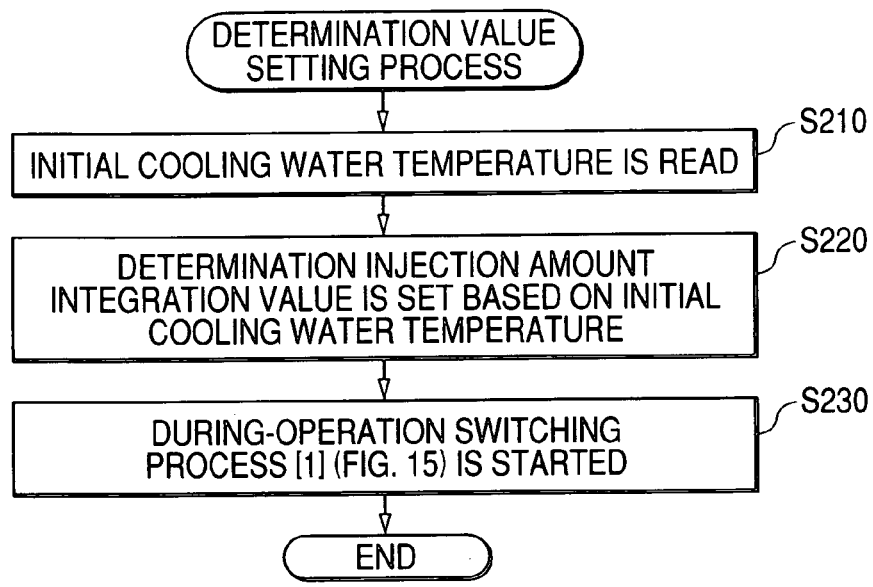
FIG. 13 is a flowchart showing the procedure of processing a "determination value setting process" executed as a part of the "circulation mechanism control process" in the second embodiment.

The "circulation mechanism control process" includes the following processes:
A "before-start switching process" (FIG. 12);
A "determination value setting process" (FIG. 13);
An "during-operation switching process [1]" (FIG. 15); and
An "during-operation switching process [2]" (FIG. 16).
These processes will hereinafter be described.

Additionally, in this embodiment, the aforesaid processes are executed in the following order: the "before-start switching process"□the "determination value setting process"□the "during-operation switching process [1]"□the "during-operation switching process [2]".

<Before-Start Switching Process>

FIG. 12 shows the procedure of processing the "before-start switching process". Additionally, the electronic control unit E starts this process before the start of the internal combustion engine 109.

[Step S110] It is determined whether the start preparation operation of the internal combustion engine 109 is performed or not.

This embodiment is configured such that the start preparation operation of the internal combustion engine 109 is detected on the basis that the ignition switch is switched from "OFF" to "ON" through driver's operation.

When the start preparation operation of the internal combustion engine 109 is detected (the ignition switch is switched from "OFF" to "ON"), the process moves to the process of step S120.

When the start preparation operation of the internal combustion engine 109 is not detected, the process of step S110 is executed again.

[Step S120] The cooling water circulation mechanism 105 is driven in the first circulation mode (FIG. 8).

[Step S130] It is determined whether or not high-temperature cooling water stored in the heat insulating container 151 is sufficiently supplied into the cooling water chamber 133B of the regulator 133.

This embodiment is configured to detect that high-temperature cooling water is sufficiently supplied into the regulator 133, on the basis that the period of time during which the cooling water circulation mechanism 105 is driven in the first circulation mode (first mode driving period TC), i.e., the period of circulation of cooling water through the first circulation circuit, is longer than or equal to a determination period TDX.

When high-temperature cooling water is sufficiently supplied into the regulator 133 (when the first mode driving period TD is longer than or equal to the determination period TDX), the process moves to the process of step S140.

When high-temperature cooling water is not sufficiently supplied into the regulator 133, the process of step S130 is executed again.

[Step S140] The circulation mode of the cooling water circulation mechanism 105 is switched from the first circulation mode (FIG. 8) to the second circulation mode (FIG. 9).

[Step S150] The "determination value setting process" (FIG. 13) is started, thus ending this process.

Thus, in the "before-start switching process", based on the start preparation operation of the internal combustion engine 109, high-temperature cooling water stored in the heat insulating container 151 is supplied into the cooling water chamber 133B of the regulator 133. And, on the basis that high-temperature cooling water is sufficiently supplied into the regulator 133, the circulation mode of the cooling water circulation mechanism 105 is switched from the first circulation mode to the second circulation mode, thereby confining high-temperature cooling water into the regulator 133.

<Determination Value Setting Process>

FIG. 13 shows the procedure of processing the "determination value setting process".

[Step S210] The temperature of a regulator cooling water temperature TWR detected through a regulator water temperature sensor E2 is read immediately after completion of the confinement of cooling water into the regulator 133 (immediately after switching from the first circulation mode to the second circulation mode). Additionally, the regulator cooling water temperature TWR read at this time is hereinafter called as an initial cooling water temperature TWRIN.

[Step S220] The initial cooling water temperature TWRIN is applied to a determination injection amount integration value map (FIG. 14) to set the determination injection amount integration value FSUMX. Additionally, the relationship between the initial cooling water temperature TWRIN and the determination injection amount integration value FSUMX is pre-set through an experiment, etc.

[Step S230] The "during-operation switching process [1]" (FIG. 15) is started, thus ending this process.

Thus, in the "determination value setting process", the determination injection amount integration value FSUMX is set based on the initial cooling water temperature TWRIN.

<During-Operation Switching Process [1]>

Figure 15:
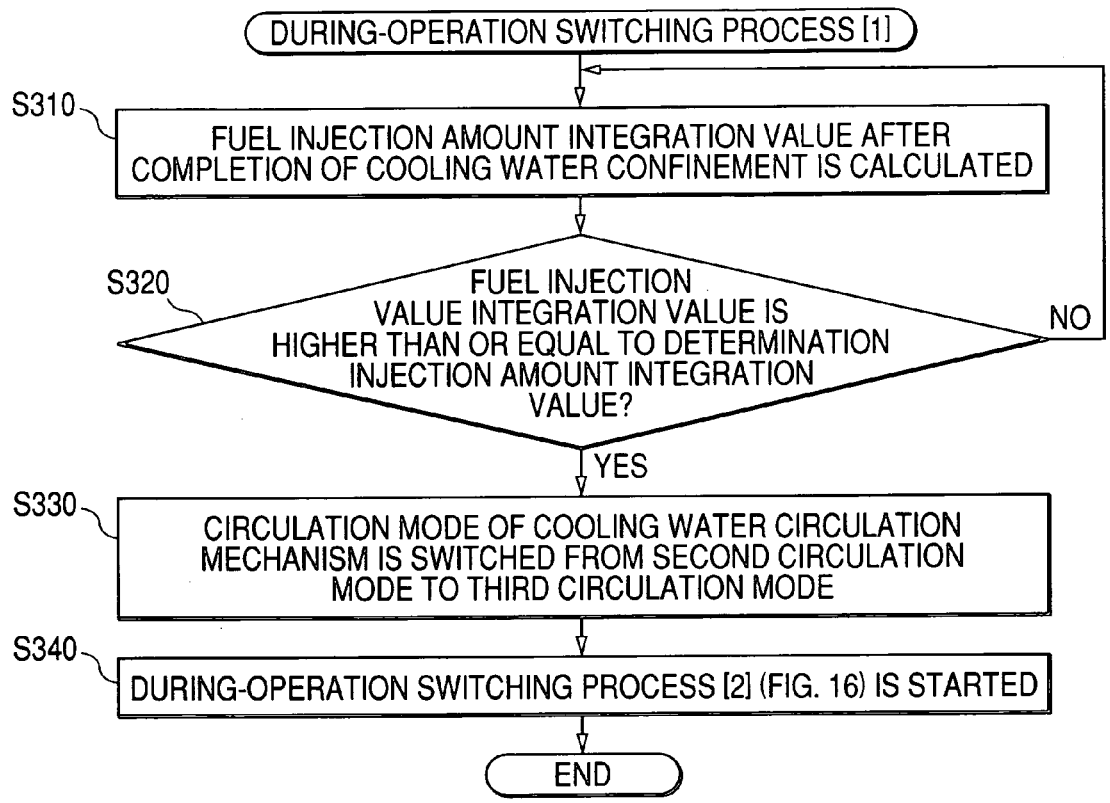
FIG. 15 is a flowchart showing the procedure of processing a "during-operation switching process [1]" executed as a part of the "circulation mechanism control process" in the second embodiment.
Figure 16:
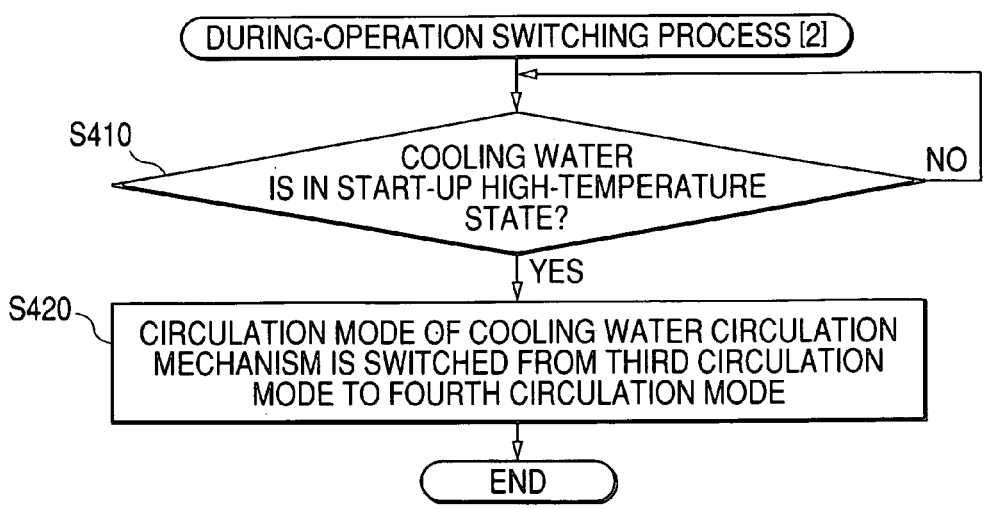
FIG. 16 is a flowchart showing the procedure of processing a "during-operation switching process [2]" executed as a part of the "circulation mechanism control process" in the second embodiment.

FIG. 15 shows the procedure of processing the "during-operation switching process [1]".

[Step S310] The accumulated amount of fuel injected through the injector 136 from the start of the internal combustion engine 109 up to the current time (fuel injection amount integration value FSUM) is calculated. Additionally, the fuel injection amount integration value FSUM is calculated by adding the current fuel injection amount to the fuel injection amount integration value FSUM calculated so far. Besides, in this embodiment, the fuel injection amount integration value FSUM is updated each time fuel is injected through the injection 136.

[Step S320] It is determined whether or not the fuel injection amount integration value FSUM is higher than or equal to the determination injection amount integration value FSUMX.

When the fuel injection amount integration value FSUM is lower than the determination injection amount integration value FSUMX, the process of step S310 is executed again.

When the fuel injection amount integration value FSUM is higher than or equal to the determination injection amount integration value FSUMX, the process moves to the process of step S330.

When the fuel injection amount integration value FSUM is higher than or equal to the determination injection amount integration value FSUMX, the electronic control unit E determines that fuel cannot be sufficiently vaporized by the heat energy of cooling water in the regulator 133. On the contrary, when the fuel injection amount integration value FSUM is lower than the determination injection amount integration value FSUMX, the electronic control unit E determines that fuel can be sufficiently vaporized by the heat energy of cooling water in the regulator 133.

[Step S330] The circulation mode of the cooling water circulation mechanism 105 is switched from the second circulation mode (FIG. 9) to the third circulation mode (FIG. 10).

[Step S340] The "during-operation switching process [2]" (FIG. 16) is started, thus ending this process.

Thus, in the "during-operation switching process [1]", the circulation mode of the cooling water circulation mechanism 105 is switched from the second circulation mode to the third circulation mode, on the basis that the fuel injection amount integration value FSUM is higher than or equal to the determination injection amount integration value FSUMX. Thereby, the confinement of cooling water is released, so that cooling water heated inside the internal combustion engine 109 is supplied to the regulator 133.

<During-Operation Switching Process [2]>

FIG. 16 shows the procedure of processing the "during-operation switching process [2]".

[Step S410] It is determined whether or not cooling water inside the internal combustion engine 109 is in the state capable of accelerating the vaporization of fuel during the next start of the internal combustion engine 109 (start-up high-temperature state).

This embodiment is configured to detect that cooling water is in the aforesaid start-up high-temperature state, on the basis that the engine cooling water temperature TWE detected through the internal combustion engine water temperature sensor E1 is higher than or equal to a determination cooling water temperature TWEX.

When cooling water inside the internal combustion engine 109 is in the start-up high-temperature state (when the engine cooling water temperature TWE is higher than or equal to the determination cooling water temperature TWEX), the process moves to the process of step S420.

When cooling water inside the internal combustion engine 109 is not in the start-up high-temperature state, the process of step S410 is executed again.

[Step S420] The circulation mode of the cooling water circulation mechanism 105 is switched from the third circulation mode (FIG. 10) to the fourth circulation mode (FIG. 11).

Thus, in the "during-operation switching process [2]", the circulation mode of the cooling water mechanism 105 is switched from the third circulation mode to the fourth circulation mode on the basis that cooling water inside the internal combustion engine 109 is in the start-up high-temperature state, thereby supplying high-temperature cooling water to the heat insulating container 151.

<Example of Control Aspect of Cooling Water Circulation Mechanism>

A control aspect of the cooling water circulation mechanism 105 will be described with reference to FIG. 17. Additionally, FIG. 17 shows an example of the control aspect of the cooling water circulation mechanism 105.

Figure 17:
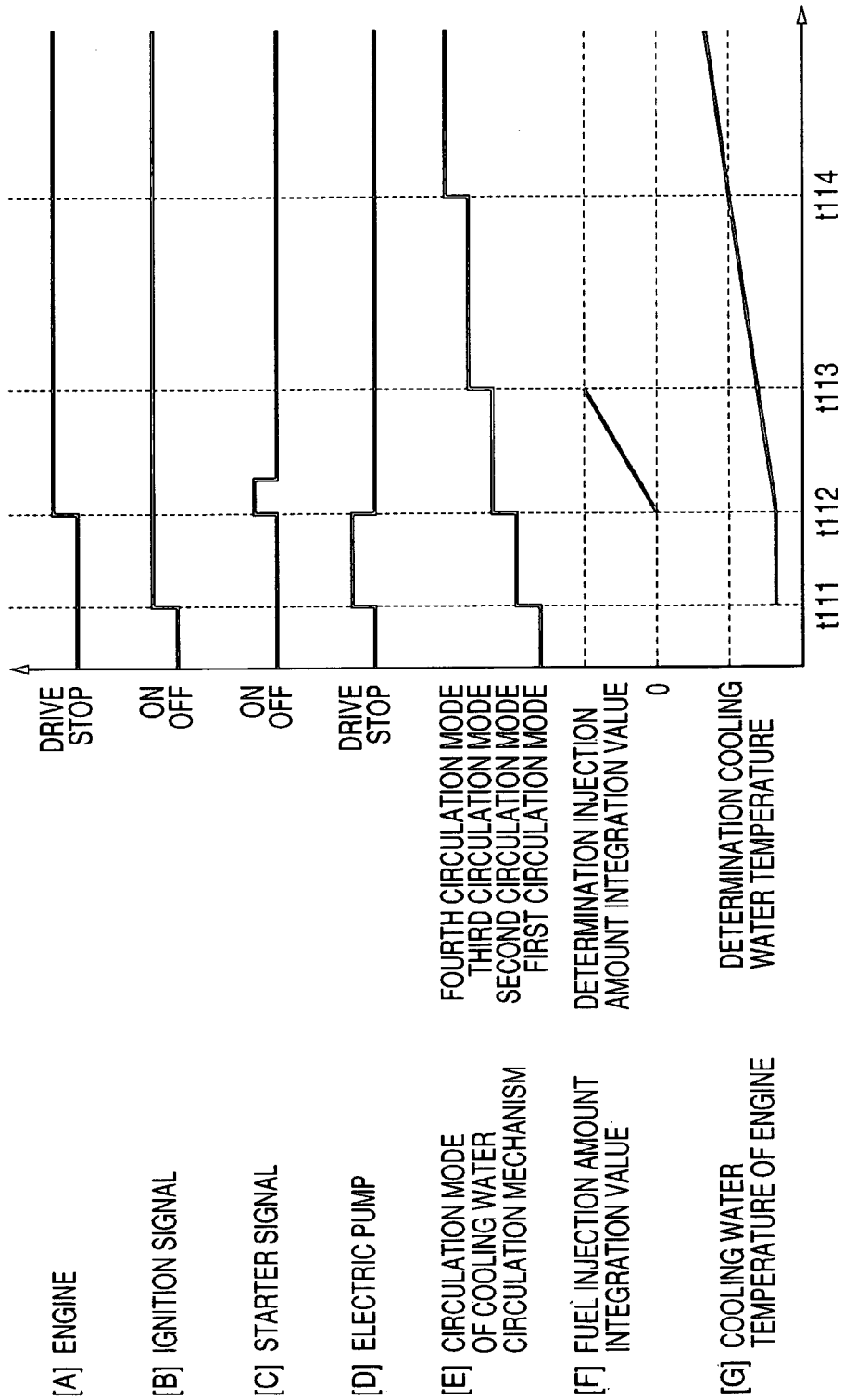
FIG. 17 is a time chart showing an example of a control mode of a cooling water circulation mechanism in the "circulation mechanism control process" of the second embodiment.

In FIG. 17, times T111 to T114 indicate the following times.

Time T111 indicates the time at which the ignition switch is switched from "OFF" to "ON" by driver's operation.

Time T112 indicates the time at which the confinement of cooling water into the regulator 133 is completed.

Time T113 indicates the time at which the fuel injection amount integration value FSUM is higher than or equal to the determination injection amount integration value FSUMX.

Time T114 indicates the time at which the engine cooling water temperature TWE is higher than or equal to the determination cooling water temperature TWEX.

When detecting that the ignition switch is switched from "OFF" to "ON" (time T111), the electronic control unit E starts the driving of the cooling water circulation mechanism 105 in the first circulation mode.

On this occasion, high-temperature cooling water stored in the heat insulating container 151 is supplied into the cooling water chamber 133B of the regulator 133. Besides, cooling water in the regulator which has a lower temperature than the supplied cooling water is pushed out of the regulator 133.

When detecting that the confinement of cooling water into the regulator is completed (when the first mode driving period TD is longer than or equal to the determination period TDX (time T112)), the electronic control unit E switches the circulation mode of the cooling water circulation mechanism 105 from the first circulation mode to the second circulation mode and allows the start of the internal combustion engine 109. Besides, the electronic control unit E starts the calculation of the fuel injection amount integration value FSUM.

On this occasion, high-temperature cooling water supplied to the regulator 133 is confined into the regulator 133. This accelerates the vaporization of fuel through the high-temperature cooling water. When the fuel injection amount integration value FSUM is higher than or equal to the determination injection amount integration value FSUMX (time T113), the electronic control unit E switches the circulation mode of the cooling water circulation mechanism 105 from the second circulation mode to the third circulation mode. Besides, the electronic control unit E ends the calculation of the fuel injection amount integration value FSUM.

On this occasion, cooling water inside the internal combustion engine 109 which has reached a high temperature is supplied to the regulator 133. This maintains the state in which fuel is sufficiently vaporized in the regulator 133.

When the engine cooling water temperature TWE is higher than or equal to the determination cooling water temperature TWEX (time T114), the electronic control unit E switches the circulation mode of the cooling water circulation mechanism 105 from the third circulation mode to the fourth circulation mode.

On this occasion, high-temperature cooling water inside the internal combustion engine 109 is supplied to the heat insulating container 151. This makes it possible that the vaporization performance of the regulator 133 through the high-temperature cooling water stored in the heat insulating container 151 is secured during the next start of the internal combustion engine 109.

Effects of Embodiment

As described in detail above, according to the fuel supply apparatus for liquefied gas engine of this second embodiment, the effects listed below are obtained.

(1) The liquefied gas fuel supply apparatus 100 of this embodiment is configured such that, prior to the start of the internal combustion engine 109 (when the start preparation operation is detected), high-temperature cooling water stored in the heat insulating container 151 is confined into the regulator 133. Thereby, during the start of the internal combustion engine 109 (especially during cold start), fuel can be sufficiently vaporized through the confined cooling water.

(2) The liquefied gas fuel supply apparatus 100 of this embodiment is configured such that switching from the second circulation mode to the third circulation mode is performed based on the result of comparison between the fuel injection amount integration value FSUM and the determination injection amount integration value FSUMX. Thereby, when the vaporization of fuel is not accelerated through cooling water confined in the regulator 133, cooling water heated in the internal combustion engine 109 is rapidly supplied to the regulator 133. Therefore, this makes it possible to suitably maintain the state in which fuel is sufficiently vaporized.

(3) The liquefied gas fuel supply apparatus 100 is configured such that the determination injection amount integration value FSUMX is set based on the regulator cooling water temperature TWR (initial cooling water temperature TWRIN) immediately after the circulation mode is switched from the first circulation mode to the second circulation mode.

Incidentally, the consumption of heat energy of cooling water by the latent heat of vaporization of fuel has not occurred immediately after cooling water is confined into the regulator 133. Therefore, the initial cooling water temperature TWRIN can be adopted as an index value of heat energy of cooling water in the regulator 133.

Accordingly, the determination injection amount integration value SFUMX is set in accordance with the aforesaid aspect, thereby making it possible to more accurately perform switching from the second circulation mode to the third circulation mode.

(4) Besides, the vaporization of fuel can be accelerated by using up to the limit of heat energy of cooling water confined in the regulator 133, thus making it possible that a reduction in the vaporization performance of the regulator 133 is avoided through a small amount of cooling water. Furthermore, the heat insulating container 151 of smaller capacity is adopted, thereby making it possible to contribute to a reduction in size of the apparatus.

(5) As a method for releasing the confinement of cooling water (method of switching from the second circulation mode to the third circulation mode), the following method can also be considered separately from the method of the invention. That is, the circulation mode may be switched from the second circulation mode to the third circulation mode, on the basis that the detection value of the regulator water temperature sensor E2 (regulator cooling water temperature TWR) has fallen below a pre-set determination value.

Additionally, the aforesaid determination value is pre-set as a value for determining whether or not cooling water in the regulator 133 is in the state capable of sufficiently vaporizing fuel. When the regulator cooling water temperature TWR is higher than or equal to the determination value, it is determined that cooling water in the regulator has heat energy capable of sufficiently vaporizing fuel. On the contrary, when the regulator cooling water temperature TWR is lower than the determination value, it is determined that cooling water in the regulator does not have heat energy capable of sufficiently vaporizing fuel.

In the meantime, when fuel is vaporized in the regulator 133, more heat energy is drawn from cooling water nearer to the fuel chamber 133A, so that temperature distribution in the cooling water chamber 133B becomes nonuniform. Accordingly, while fuel is being vaporized through the regulator 133, there is a small degree of correlation between the regulator cooling water temperature TWR detected by the regulator water temperature sensor E2 and the magnitude of heat energy of cooling water in the regulator 133. Incidentally, the regulator cooling water temperature TWR indicated through the regulator water temperature sensor E2, while fuel is being vaporized, shows different values depending upon the position of attachment of the regulator water temperature sensor E2.

Consequently, there arise the following problems when the circulation mode of the cooling water circulation mechanism 105 is switched, as aforesaid, based on the detection value of the regulator water temperature sensor E2.

That is, although cooling water in the regulator 133 actually does not have heat energy for sufficiently vaporizing fuel, in some cases, switching from the second circulation mode to the third circulation mode is not performed on the basis that the regulator cooling water temperature TWR is higher than or equal to the determination value. In this case, the state, in which cooling water that does not have sufficient heat energy is confined in the regulator 133, is continued, thereby involving a reduction in the vaporization performance of the regulator 133.

Besides, on the contrary, although cooling water in the regulator 133 actually has heat energy capable of sufficiently vaporizing fuel, in some cases, switching from the second circulation mode to the third circulation mode is performed on the basis that the regulator cooling water temperature TWR is lower than the determination value. In this case, cooling water that is not sufficiently heated inside the internal combustion engine 109 is supplied into the regulator 133, and high-temperature cooling water is pushed out from the regulator 133, which is also considered to lead to a lack of the vaporization performance of the regulator 133.

In this respect, the liquefied gas fuel supply apparatus 100 is configured as follows. That is, the fuel injection amount integration value FSUM is used as an index value of the accumulated amount of fuel vaporized in the regulator 133. And, based on the result of comparison between this fuel injection amount integration value and the determination injection amount integration value FSUMX, it is determined whether or not cooling water in the regulator 133 has heat energy capable of sufficiently vaporize fuel. Therefore, switching from the second circulation mode to the third circulation mode (the release of the confinement of cooling water) can be properly performed.

(6) As a method for releasing the confinement of cooling water (method of switching from the second circulation mode to the third circulation mode), the following method can also be considered in addition to the aforesaid method based on the regulator cooling water temperature TWR. That is, the circulation mode may be switched to the third circulation mode (the confinement of cooling water can also be released) on the basis that an elapsed time after switching to the second circulation mode is longer than or equal to a predetermined period of time.

The amount of fuel vaporized through the regulator 133 varies according to the operating state of the internal combustion engine 109. Therefore, when the aforesaid method is adopted, there arise the following problems.

That is, when the aforesaid predetermined period of time is set so as to accommodate a high-load operation of the internal combustion engine 109, suppose that a low-load operation is performed during the start of the internal combustion engine 109. Then, although cooling water in the regulator 133 has sufficient heat energy, in some cases, the confinement of cooling water is released on the basis that an elapsed time after switching to the second circulation mode is longer than or equal to the aforesaid predetermined period of time.

On this occasion, as the internal combustion engine 109 is operated at a low load, cooling water inside the internal combustion engine 109 which is not sufficiently heated (cooling water that has a lower temperature than the cooling water in the regulator) is supplied to the regulator 133, thereby involving a reduction in the vaporization performance of the regulator 133.

Besides, when the aforesaid predetermined period of time is set so as to accommodate a low-load operation of the internal combustion engine 109, suppose that a high-load operation is performed during the start of the internal combustion engine 109. Then, although the cooling water in the regulator 133 lacks heat energy, in some cases, the confinement of cooling water is continued on the basis that an elapsed time after switching to the second circulation mode is shorter than the aforesaid predetermined period time.

On this occasion, cooling water that does not have sufficient heat energy for vaporizing fuel continues to accumulate in the regulator 133, thereby involving a reduction in the vaporization performance of the regulator 133.

The liquefied gas fuel supply apparatus 100 of the invention, as aforesaid, is configured such that switching from the second circulation mode to the third circulation mode (release of the confinement of cooling water) is performed based on the result of comparison between the fuel injection amount integration value FSUM and the determination injection amount integration value FSUMX. Therefore, the aforesaid concerns over the switching method can be eliminated.

Modified Examples

Additionally, the aforesaid second embodiment can also be carried out as appropriately modified, for example, in the following modes.

Figure 14:
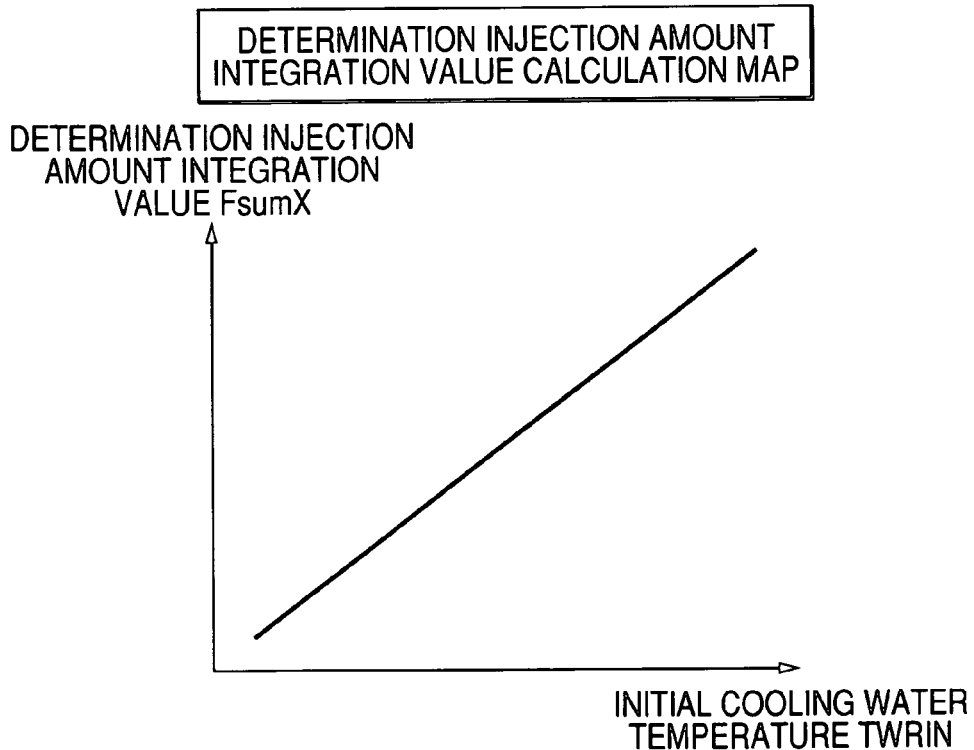
FIG. 14 is a graph showing an example of a determination injection amount integration value calculation map used in the "determination value setting process" of the second embodiment.

The aforesaid second embodiment is configured such that the determination injection amount integration value FSUMX is calculated through the determination injection amount integration value calculation map of FIG. 14. However, the relationship between the initial cooling water temperature TWRIN and the determination injection amount integration value FSUMX in the determination injection amount integration value calculation map is not limited to the illustrated relationship. In short, any appropriate calculation map can be adopted as long as it is a determination injection amount integration value calculation map having the relationship in which the determination injection amount integration value FSUMX increases as the initial cooling water temperature TWRIN increases.

The aforesaid second embodiment is configured such that the determination injection amount integration value FSUMX is set based on the initial cooling water temperature TWRIN, but may be modified as follows. That is, the determination injection amount integration value FSUMX may be set based on the initial cooling water temperature TWRIN and an ambient air temperature. Incidentally, cooling water confined in the regulator 133 is cooled not only by the latent heat of vaporization of fuel but also by the ambient air. Accordingly, the determination injection amount integration value FSUMX is set in accordance with the aforesaid aspect, thereby making is possible to more accurately release the confinement of cooling water.

Third Embodiment

A third embodiment of the invention will be described with reference to FIGS. 18 to 20.

This embodiment assumes the case in which the invention is applied to a fuel supply apparatus (mixer type fuel supply apparatus) that supplies fuel to a combustion chamber of an internal combustion engine 109 through a carburetor. That is, the fuel supply apparatus of this embodiment is configured to include the carburetor in place of the injector in the fuel supply apparatus of the aforesaid first embodiment.

And, control as to the release of the confinement of cooling water is modified in response to such a modification of the fuel supply method.

In this embodiment, the accumulated amount of an intake air amount is used as an index value of the accumulated amount of fuel vaporized through a regulator 133, and switching from the second circulation mode to the third circulation mode is performed based on the result of comparison between this accumulated amount and an intake-air amount determination value. That is, the accumulated amount of air taken into the internal combustion engine 109 after the start of the internal combustion engine 109 (intake air amount integration value QSUM) is calculated, and the confinement of cooling water is released on the basis that this intake air amount integration value QSUM is higher than or equal to a determination intake amount integration value QSUMX (intake-air amount determination value).

The aforesaid determination intake amount integration value QSUMX is set as a value for determining whether or not cooling water confined in the regulator 133 has heat energy capable of sufficiently vaporizing fuel. When the intake air amount integration value QSUM is lower than the determination intake amount integration value QSUMX, the state is that fuel can be sufficiently vaporized by the heat energy of cooling water in the regulator 133. On the contrary, when the intake air amount integration value QSUM is higher than or equal to the determination intake amount integration value QSUMX, the state is that fuel cannot be sufficiently vaporized by the heat energy of cooling water in the regulator 133.

In the fuel supply apparatus of this embodiment, there is the correlation between the intake air amount and the amount of fuel supplied to the internal combustion engine 109 through the carburetor. Therefore, the same working effects as those of the aforesaid second embodiment can be exerted even by releasing the confinement of cooling water in accordance with the aforesaid aspect.

Processes modified from the aforesaid second embodiment in an "injection mechanism control process" will hereinafter be described. Additionally, the same configurations as those of the aforesaid second embodiment are adopted for other than the configurations to be described hereinafter.

<Determination Value Setting Process>

Figure 18:
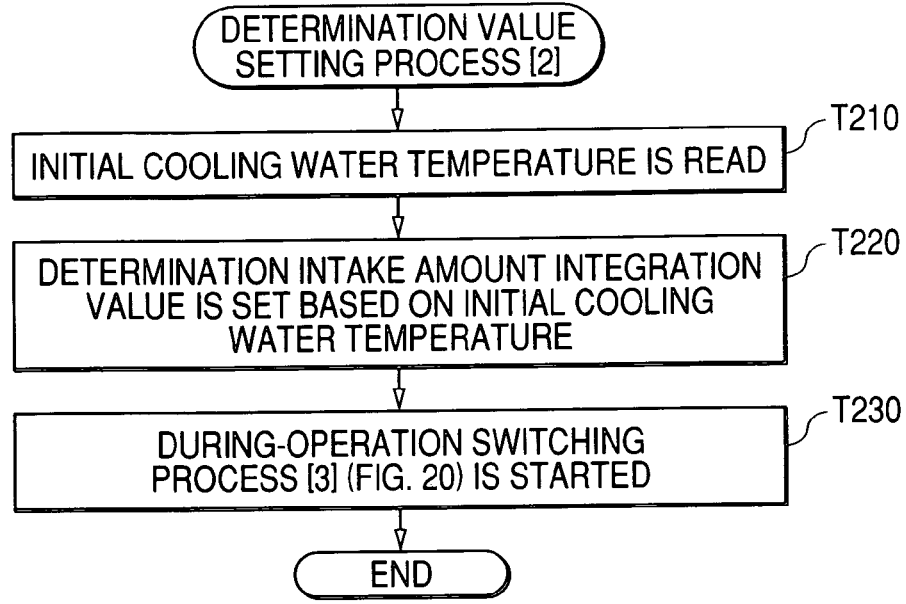
FIG. 18 is a time chart showing the procedure of processing a "determination value setting process [2]" executed as a part of a "circulation mechanism control process" by a fuel supply apparatus for liquefied gas engine according to a third embodiment of the invention.

FIG. 18 shows the procedure of processing a "determination value setting process [2]".

[Step T210] A regulator cooling water temperature TWR (initial cooling water temperature TWRIN) immediately after completion of the confinement of cooling water into the regulator 133 is read.

[Step T220] The initial cooling water temperature TWRIN is applied to a determination intake amount integration value map (FIG. 19) to set the determination intake amount integration value QSUMX. Additionally, the relationship between the initial cooling water temperature TWRIN and the determination intake amount integration value QSUMX is pre-set through an experiment, etc.

[Step T230] An "during-operation switching process [3]" (FIG. 20) is started, thus ending this process.

Thus, in the "determination value setting process", the determination intake amount integration value QSUMX is set based on the initial cooling water temperature TWRIN.

<During-Operation Switching Process [3]>

Figure 20:
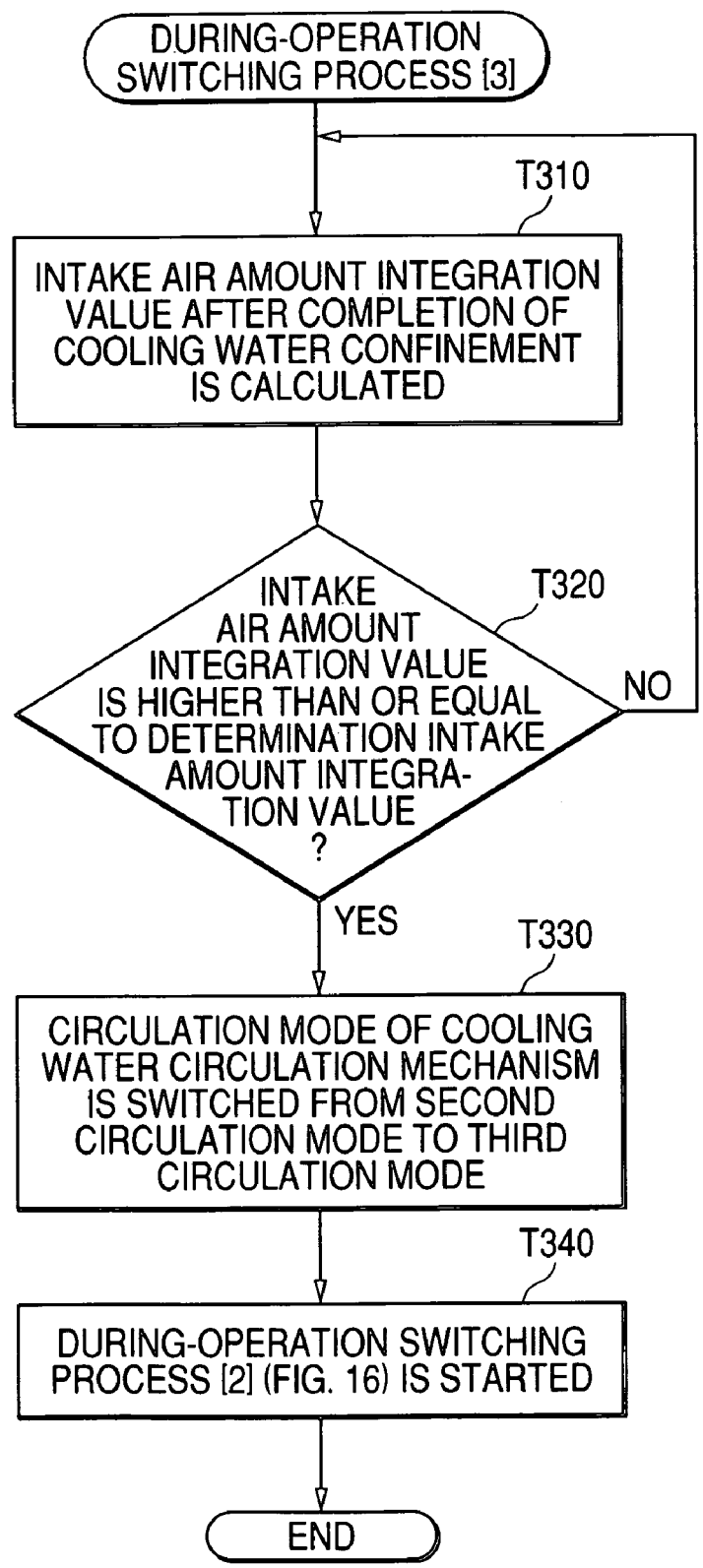
FIG. 20 is a flowchart showing the procedure of processing a "during-operation switching process [3]" executed as a part of the "circulation mechanism control process" in the third embodiment.

FIG. 20 shows the procedure of processing the "during-operation switching process [3]".

[Step T310] The accumulated amount of air taken into the internal combustion engine 109 from the start of the internal combustion engine 109 up to the current time (intake air amount integration value QSUM) is calculated. Additionally, the intake air amount integration value QSUM is calculated based on an intake air amount detected through an airflow meter.

[Step T320] It is determined whether or not the intake air amount integration value QSUM is higher than or equal to the determination intake amount integration value QSUMX.

When the intake air amount integration value QSUM is lower than the determination intake amount integration value QSUMX, the process of step T310 is executed again.

When the intake air amount integration value QSUM is higher than or equal to the determination intake amount integration value QSUMX, the process moves to the process of step T330.

When the intake air amount integration value QSUM is higher than or equal to the determination intake amount integration value QSUMX, the electronic control unit E determines that fuel cannot be sufficiently vaporized by the heat energy of cooling water in the regulator 133. On the contrary, when the intake air amount integration value QSUM is lower than the determination intake amount integration value QSUMX, the electronic control unit E determines that fuel can be sufficiently vaporized by the heat energy of cooling water in the regulator 133.

[Step T330] The circulation mode of the cooling water circulation mechanism 105 is switched from the second circulation mode (FIG. 9) to the third circulation mode (FIG. 10).

[Step T340] The "during-operation switching process [2]" (FIG. 16) is started, thus ending this process.

Thus, in the "during-operation switching process [3]", the circulation mode of the cooling water circulation mechanism 105 is switched from the second circulation mode to the third circulation mode, on the basis that the intake air amount integration value QSUM is higher than or equal to the determination intake amount integration value QSUMX. Thereby, the confinement of cooling water is released, so that cooling water heated inside the internal combustion engine 109 is supplied to the regulator 133.

<Effects of Embodiment>

As described in detail above, according to the fuel supply apparatus for liquefied gas engine of this third embodiment, the same effects as those of the aforesaid (1) to (6) of the foregoing second embodiment can be obtained.

Modified Examples

Additionally, the aforesaid third embodiment may be carried out as appropriately modified, for example, in the following modes.

Figure 19:
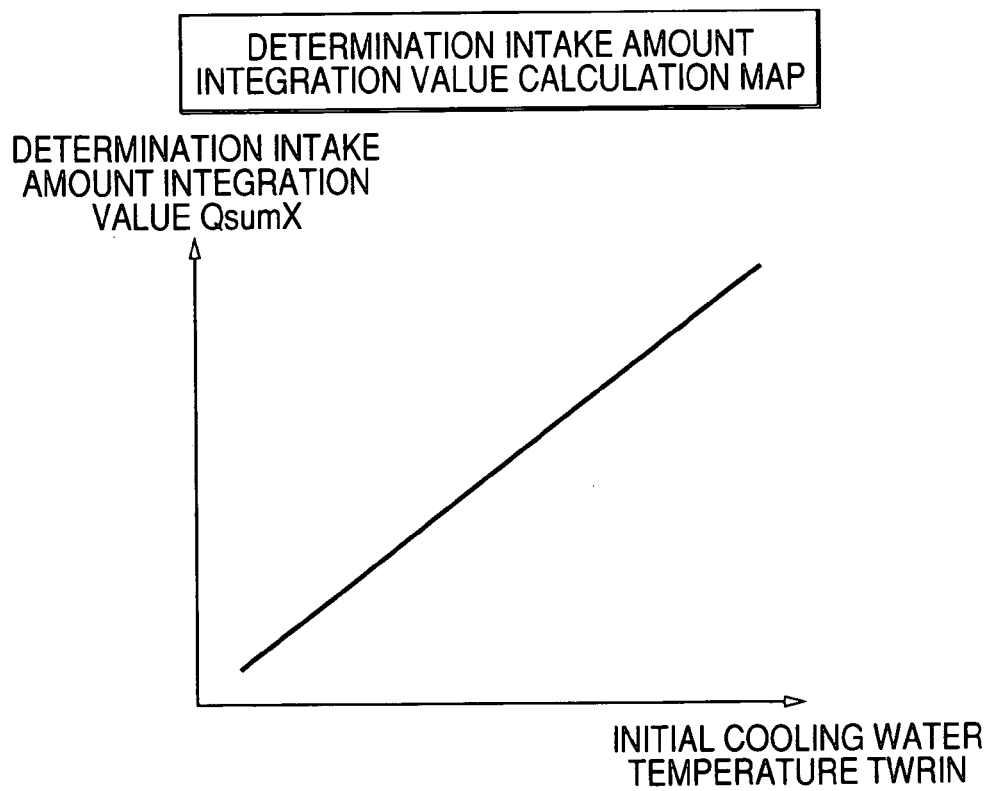
FIG. 19 is a graph showing an example of a determination injection amount integration value calculation map used in the "determination value setting process [2]" of the third embodiment.

The aforesaid third embodiment is configured such that the determination intake amount integration value QSUMX is calculated through the determination intake amount integration value calculation map of FIG. 19. However, the relationship between the initial cooling water temperature TWRIN and the determination intake amount integration value QSUMX in the determination intake amount integration value calculation map is not limited to the illustrated relationship. In short, any appropriate calculation map can be adopted as long as it is a determination intake amount integration value calculation map having the relationship in which the determination intake amount integration value QSUMX increases as the initial cooling water temperature TWRIN increases.

The aforesaid third embodiment is configured such that the determination intake amount integration value QSUMX is set based on the initial cooling water temperature TWRIN, but may be modified as follows. That is, the determination intake amount integration value QSUMX may be set based on the initial cooling water temperature TWRIN and the ambient air temperature Incidentally, cooling water confined in the regulator 133 is cooled not only by the latent heat of vaporization of fuel but also by the ambient air. Accordingly, the determination intake amount integration value QSUMX is set in accordance with the aforesaid aspect, thereby making it possible to more accurately release the confinement of cooling water.

Other Embodiments

Other modifiable elements common to the aforesaid embodiments will be listed below.

Each aforesaid embodiment is configured such that the start preparation operation of the internal combustion engine 109 is detected on the basis that the ignition switch is switched from "OFF" to "ON" through driver's operation. However, conditions for detecting such a state are not limited to the conditions illustrated in each of the embodiments. For example, the start preparation operation of the internal combustion engine 109 may be detected on the basis that a door of the vehicle is opened.

Each aforesaid embodiment is configured to detect that high-temperature cooling water is sufficiently supplied into the regulator 133, on the basis that the period of time during which cooling water has circulated through the first circulation circuit (first mode driving period TD) is longer than or equal to the determination period TDX. However, conditions for detecting such a state are not limited to the conditions illustrated in each of the embodiments.

For example, any one of detection methods [A] and [B] shown below may be adopted.

[A] It is detected that high-temperature cooling water is sufficiently supplied into the regulator 133 on the basis that the temperature of cooling water in the regulator 133 has reached a pre-set determination value or higher.

[B] It is detected that high-temperature cooling water is sufficiently supplied into the regulator 133 on the basis that the degree of increase in the temperature of cooling water in the regulator 133 is higher than or equal to a pre-set determination value.

Each aforesaid embodiment is configured such that the regulator water temperature sensor E2 is disposed in the cooling water chamber 133B of the regulator 133, but may be modified as follows. That is, the regulator water temperature sensor E2 may be disposed at the inlet or outlet of the cooling water chamber 133B.

Each aforesaid embodiment assumes the liquefied gas fuel supply apparatus 100 having the configuration shown in FIG. 7. However, the configuration of the fuel injection mechanism 103 of the liquefied gas fuel supply apparatus 1 is not limited to the configuration illustrated in each of the embodiments. In short, the configuration of the fuel injection mechanism 103 can be appropriately modified if the fuel injection mechanism 103 is configured to include the regulator 133 that pressure-regulates and vaporizes liquid-phase fuel.

Each aforesaid embodiment assumes the liquefied gas fuel supply apparatus 100 of the configuration shown in FIG. 7. However, the configuration of the cooling water circulation mechanism 105 of the liquefied gas fuel supply apparatus 1 is not limited to the configuration illustrated in each of the embodiments. In short, the configuration of the cooling water circulation mechanism 105 can be appropriately modified if the cooling water circulation mechanism 105 is configured to include: the first circulation circuit that circulates cooling water between the heat insulating container 151 and the regulator 133, not via the internal combustion engine 109; the second circulation circuit that circulates cooling water via the internal combustion engine 109 and not via the regulator 133; and the third circulation circuit that circulates cooling water between the internal combustion engine 109 and the regulator 133.

In each aforesaid embodiment, the invention is applied to the fuel supply apparatus for liquefied petroleum gas engine with liquefied petroleum gas as its fuel. However, the invention can be applied to any fuel supply apparatus that is a fuel supply apparatus for liquefied gas engine with liquefied gas as its fuel, such as compressed natural gas (CNG) and dimethyl ether (DME). Besides, even in such a case, the same working effects as those of each aforesaid embodiment can be exerted.

What is claimed is:

1. A heating system for a liquefied gas fuel supply apparatus that vaporizes liquefied gas fuel by a vaporizer to supply the vaporized gas fuel to an internal-combustion engine, the heating system comprising:
   a circulation circuit that circulates heating medium between the vaporizer and an inside of the internal-combustion engine; and
   a heat insulating container that stores the heating medium, the heat insulating container disposed in the circulation circuit; and
   a shutoff valve that shuts off circulation of the heating medium to the vaporizer,
   wherein the shutoff valve shuts off the circulation of the heating medium to the vaporizer after the heating medium stored in the heat insulating container is fed to the vaporizer.

2. The heating system according to claim 1, further comprising:
   a three-way valve disposed in the circulation circuit;
   a first passage providing a connection between one end of a heating medium passage of the inside of the internal combustion engine and the three-way valve;
   a second passage providing a connection between the three-way valve and the vaporizer;
   a third passage providing a connection between the three-way valve and the heat insulating container;
   a fourth passage connecting the heat insulating container with the other end of the inside of the internal-combustion engine; and
   a fifth passage connecting the vaporizer with the fourth passage.

3. A heating system for a liquefied gas fuel supply apparatus that vaporizes liquefied gas fuel by a vaporizer to supply the vaporized gas fuel to an internal-combustion engine, the heating system comprising:
   a circulation circuit that circulates heating medium between the vaporizer and an inside of the internal-combustion engine; and
   a heating insulating container that stores the heating medium, the heat insulating container being disposed in the circulation circuit,
   wherein the circulation circuit includes:
   a first circulation circuit that circulates the heating medium between the vaporizer and the heat insulating container, and not through the inside of the internal combustion engine; and
   a second circulation circuit that circulates the heating medium between the heat insulating container and the inside of the internal combustion engine, and not through the vaporizer.

4. The heating system according to claim 3, further comprising a first circulation-circuit shutoff valve that shuts off circulation of the heating medium in the first circulation circuit.

5. The heating system according to claim 3, further comprising a second circulation-circuit shutoff valve that shuts off circulation of the heating medium in the second circulation circuit.

6. The heating system according to claim 3, wherein the circulation circuit further includes a third circulation circuit that circulates the heating medium between the vaporizer and the inside of the internal combustion engine, and not through the heat insulating container.

* * * * *